United States Patent
Himura et al.

(10) Patent No.: US 11,373,173 B2
(45) Date of Patent: Jun. 28, 2022

(54) DISTRIBUTED LEDGER SYSTEM, DISTRIBUTED LEDGER SUBSYSTEM, AND DISTRIBUTED LEDGER NODE

(71) Applicant: Hitachi, Ltd., Tokyo (JP)

(72) Inventors: Yosuke Himura, Tokyo (JP); Tatsuya Sato, Tokyo (JP); Yusuke Arai, Tokyo (JP); Takayuki Nagai, Tokyo (JP); Hironori Emaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 16/296,861

(22) Filed: Mar. 8, 2019

(65) Prior Publication Data

US 2019/0354966 A1 Nov. 21, 2019

(30) Foreign Application Priority Data

May 16, 2018 (JP) .............................. JP2018-094530

(51) Int. Cl.
*G06Q 20/38* (2012.01)
*G06F 16/182* (2019.01)

(52) U.S. Cl.
CPC ....... *G06Q 20/382* (2013.01); *G06F 16/1824* (2019.01); *G06Q 20/389* (2013.01)

(58) Field of Classification Search
CPC . G06Q 20/382; G06Q 20/389; G06F 16/1824
See application file for complete search history.

(56) References Cited

U.S. PATENT DOCUMENTS

| 2015/0074349 A1* | 3/2015 | Naganuma ............ G06F 3/0607 711/114 |
| 2016/0004582 A1* | 1/2016 | Nagura ................... G06F 11/34 714/15 |

(Continued)

FOREIGN PATENT DOCUMENTS

WO  WO-2017136956 A1 *  8/2017  ............. G06F 16/27

OTHER PUBLICATIONS

Bocek T., Stiller B. (2018) Smart Contracts—Blockchains in the Wings. In: Linnhoff-Popien C., Schneider R., Zaddach M. (eds) Digital Marketplaces Unleashed. Springer, Berlin, Heidelberg. First Online: Sep. 15, 2017 (Year: 2018).*

(Continued)

*Primary Examiner* — Patrick McAtee
*Assistant Examiner* — Terry Nathan Murray
(74) *Attorney, Agent, or Firm* — Crowell & Moring LLP

(57) ABSTRACT

A distributed ledger system has a configuration in which each of the distributed ledger subsystems includes a sub-ledger that holds ledger data shared in the distributed ledger subsystems, and a smart contract that interlocks between the distributed ledger subsystems having a common sub-ledger to perform a transaction processing related to an input and output of the ledger data, transmits a transaction request targeted for ledger data of another sub-ledger managed by another distributed ledger subsystem to another distributed ledger subsystem having the common sub-ledger by receiving a predetermined transaction request from a predetermined device and executing the smart contract, and replies with a transaction reply obtained from the other distributed ledger subsystem to the predetermined device.

3 Claims, 21 Drawing Sheets

(56) References Cited

U.S. PATENT DOCUMENTS

| | | | | |
|---|---|---|---|---|
| 2016/0110117 A1* | 4/2016 | Suzuki | ............... | G06F 9/45558 |
| | | | | 711/117 |
| 2016/0337445 A1* | 11/2016 | Kono | .................. | H04L 67/1097 |
| 2017/0206027 A1* | 7/2017 | Nakajima | ............. | G06F 3/0617 |
| 2018/0059946 A1* | 3/2018 | Kunii | .................... | G06F 3/0604 |
| 2018/0246823 A1* | 8/2018 | Nakajima | ........... | G06F 13/1694 |
| 2018/0300382 A1* | 10/2018 | Madisetti | ........... | G06Q 20/0658 |
| 2018/0341930 A1* | 11/2018 | Moir | .................. | G06Q 20/3825 |
| 2019/0028265 A1* | 1/2019 | Bisti | .................... | G06F 21/602 |
| 2019/0073666 A1* | 3/2019 | Ortiz | .................... | H04L 9/3236 |

OTHER PUBLICATIONS

"Channels", A concept called "channel" for logically dividing the distributed ledger, Feb. 7, 2018, one page, https://hyperledger-fabric-readthedocs.io/en/release-1.0/channels.html.

* cited by examiner

FIG. 5

CASE OF DISTRIBUTED LEDGER SUBSYSTEM 131

NODE MANAGEMENT TABLE 454

| NODE (511) | ENDPOINT (512) | LEDGER (513) | SMART CONTRACT (514) |
|---|---|---|---|
| DISTRIBUTED LEDGER NODE 221a-c | node-a.org102, node-b.org102, node-c.org102 | SUB-LEDGER 303 | RESOURCE QUERY RESOURCE ORDERING |
| DISTRIBUTED LEDGER NODE 231a-c | node-a.org103, node-b.org103, node-c.org103 | | |
| DISTRIBUTED LEDGER NODE 231a-c | node-a.org103, node-b.org103, node-c.org103 | SUB-LEDGER 304 | SEARCH |
| DISTRIBUTED LEDGER NODE 231a-c | node-a.org103, node-b.org103, node-c.org103 | SUB-LEDGER 305 | RESOURCE QUERY RESOURCE ORDERING |
| DISTRIBUTED LEDGER NODE 241a-c | node-a.org104, node-b.org104, node-c.org104 | | |
| DISTRIBUTED LEDGER NODE 231a-c | node-a.org103, node-b.org103, node-c.org103 | SUB-LEDGER 306 | RESOURCE QUERY RESOURCE ORDERING |
| DISTRIBUTED LEDGER NODE 251a-c | node-a.org105, node-b.org105, node-c.org105 | | |

TRANSACTION ARGUMENT TEMPORARY MANAGEMENT TABLE 455

| TRANSACTION ID (521) | LEDGER (522) | SMART CONTRACT (523) | NODE (524) | AUTHENTICATION INFORMATION (525) |
|---|---|---|---|---|
| 123456 | SUB-LEDGER 305 | RESOURCE QUERY | DISTRIBUTED LEDGER NODE 241a | |

| MAIN RESOURCE ID (526) | NUMBER (527) | PRICE (528) | LEAD TIME (529) |
|---|---|---|---|
| PRODUCT A-1 | 2 | | |

| MAIN RESOURCE ID (531) | SUB RESOURCE ID (532) | NUMBER (533) |
|---|---|---|
| PRODUCT A-1 | COMPONENT A-1-1 | 2 |
| | COMPONENT A-1-2 | 4 |

TRANSACTION RESULT TEMPORARY MANAGEMENT TABLE 456

| TRANSACTION ID (541) | NUMBER (542) | PRICE (543) | LEAD TIME (544) |
|---|---|---|---|
| 123456 | | | |

FIG. 6A

CASE OF DISTRIBUTED LEDGER SUBSYSTEM 131

SMART CONTRACT MANAGEMENT TABLE 431

| LEDGER ~611 | SMART CONTRACT ~612 |
|---|---|
| SUB-LEDGER 303 | RESOURCE QUERY, RESOURCE ORDERING |
| SUB-LEDGER 304 | SEARCH |
| SUB-LEDGER 305 | RESOURCE QUERY, RESOURCE ORDERING |
| SUB-LEDGER 306 | RESOURCE QUERY, RESOURCE ORDERING |

LEDGER METADATA MANAGEMENT TABLE 441

| LEDGER ~621 | NODE ~622 | DATA TYPE ~623 |
|---|---|---|
| SUB-LEDGER 303 | DISTRIBUTED LEDGER NODE 221a~c, 231a~c | RESOURCE INFORMATION, LEDGER INFORMATION FOR EACH NODE |
| SUB-LEDGER 304 | DISTRIBUTED LEDGER NODE 231a~c | ADJACENT NODE INFORMATION |
| SUB-LEDGER 305 | DISTRIBUTED LEDGER NODE 231a~c, 241a~c | RESOURCE INFORMATION, LEDGER INFORMATION FOR EACH NODE |
| SUB-LEDGER 306 | DISTRIBUTED LEDGER NODE 231a~c, 251a~c | RESOURCE INFORMATION, LEDGER INFORMATION FOR EACH NODE |

FIG. 6B

CASE OF DISTRIBUTED LEDGER SUBSYSTEM 131

DATA (SUB-LEDGER 303: RESOURCE INFORMATION) 601 IN LEDGER DATA MANAGEMENT TABLE 442

| RESOURCE ID (631) | RESOURCE HOLDING AMOUNT (632) | PRICE (633) | LEAD TIME (634) |
|---|---|---|---|
| PRODUCT A | 10 | | |
| PRODUCT B | 13 | | |
| PRODUCT C | 15 | | |

DATA (SUB-LEDGER 305: RESOURCE INFORMATION) 602 IN LEDGER DATA MANAGEMENT TABLE 442

| RESOURCE ID (635) | RESOURCE HOLDING AMOUNT (636) | PRICE (637) | LEAD TIME (638) |
|---|---|---|---|
| COMPONENT A-1 | 20 | | |
| COMPONENT A-2 | 5 | | |
| COMPONENT B-1 | 30 | | |

DATA (SUB-LEDGER 306: RESOURCE INFORMATION) 603 IN LEDGER DATA MANAGEMENT TABLE 442

| RESOURCE ID (639) | RESOURCE HOLDING AMOUNT (640) | PRICE (641) | LEAD TIME (642) |
|---|---|---|---|
| COMPONENT A-3 | 10 | | |
| COMPONENT A-4 | 25 | | |
| COMPONENT B-2 | 15 | | |

DATA (SUB-LEDGER 303: LEDGER INFORMATION FOR EACH NODE) 604 IN LEDGER DATA MANAGEMENT TABLE 442

| ORGANIZATION (651) | NODE (652) | LEDGER (653) |
|---|---|---|
| org102 | DISTRIBUTED LEDGER NODE 221a TO c | SUB-LEDGER 302 |
| org103 | DISTRIBUTED LEDGER NODE 231a TO c | SUB-LEDGER 304 |

DATA (SUB-LEDGER 304: ADJACENT NODE INFORMATION) 605 IN LEDGER DATA MANAGEMENT TABLE 442

| RESOURCE ID (661) | ORGANIZATION (662) | LEDGER (663) | SMART CONTRACT (664) | NODE (665) |
|---|---|---|---|---|
| COMPONENT A-1 | org104 | SUB-LEDGER 305 | RESOURCE QUERY | DISTRIBUTED LEDGER NODE 241a-c |
| COMPONENT A-2 | | | | |
| COMPONENT A-3 | org105 | SUB-LEDGER 306 | RESOURCE QUERY | DISTRIBUTED LEDGER NODE 251a-c |
| COMPONENT A-4 | | | | |

FIG. 7B

TRANSACTION RESULT TEMPORARY MANAGEMENT TABLE 722

| TRANSACTION ID 731 | TRANSACTION INTERNAL ID 732 | SUB RESOURCE ID 733 | NUMBER 734 | PRICE 735 | LEAD TIME 736 |
|---|---|---|---|---|---|
| 123456 | TX-C1 | COMPONENT A-1 | | | |
| 123456 | TX-C2 | COMPONENT A-2 | | | |

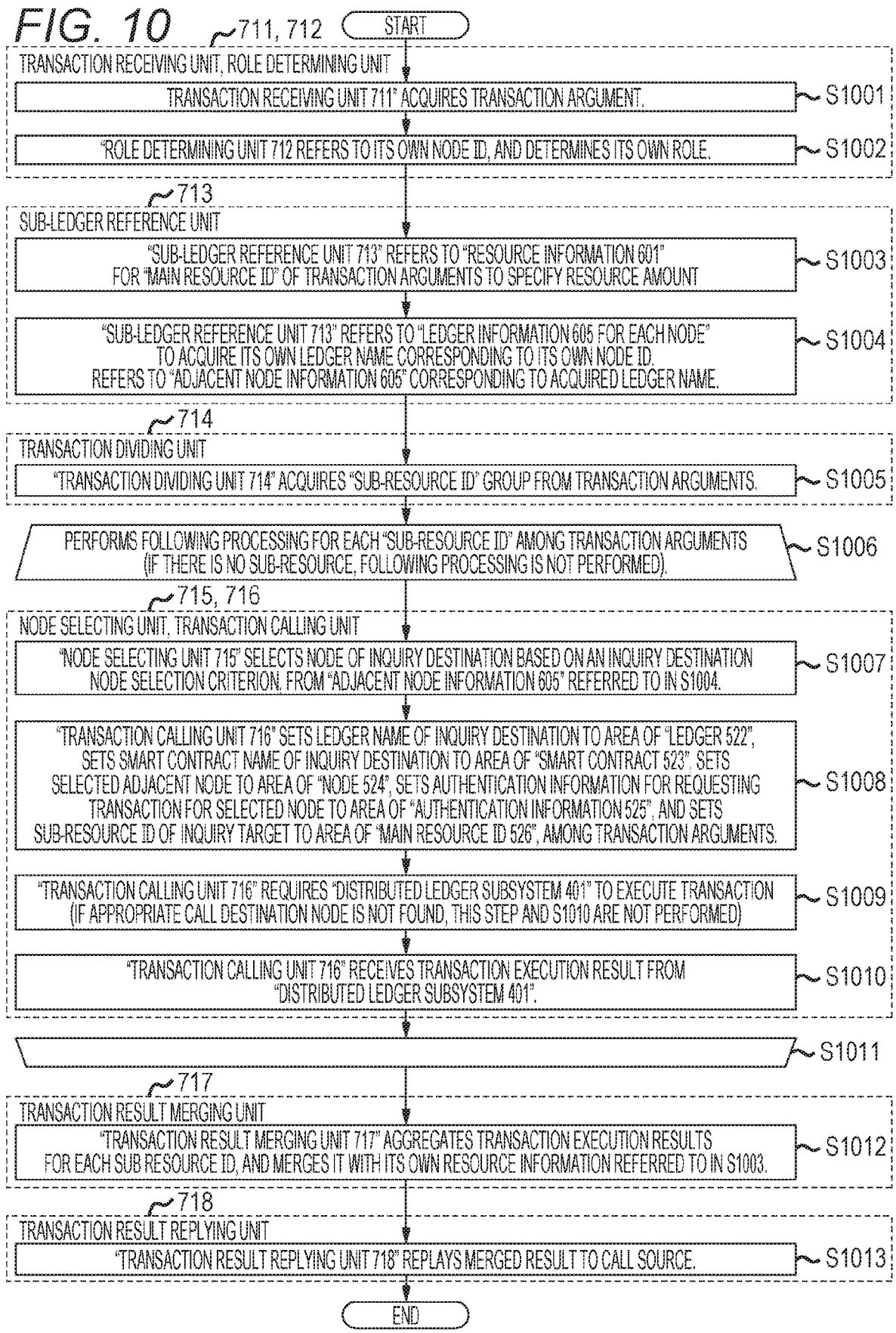

DISTRIBUTED LEDGER SYSTEM, DISTRIBUTED LEDGER SUBSYSTEM, AND DISTRIBUTED LEDGER NODE

CROSS-REFERENCE TO RELATED APPLICATION

This application claims priority pursuant to 35 U.S.C. § 119 from Japanese Patent Application No. 2018-094530, filed on May 16, 2018, of which is incorporated herein by reference.

BACKGROUND

Technical Field

The present invention relates to a distributed ledger system, a distributed ledger subsystem, and a distributed ledger node, and more particularly, to a technology for efficiently performing appropriate information sharing across each of the sub-ledger networks.

Related Art

In recent years, distributed ledger technology has attracted attention in various fields. A distributed ledger is a distributed database characterized by securely sharing data exchanged between a plurality of calculation nodes. The data stored in the distributed ledger is called ledger data, and the set of calculation nodes sharing the same ledger data set is called a distributed ledger system.

One of the features of the distributed ledger technology is the presence of a smart contract. The smart contract is also called a digitalized (software programmed) contract, and it is implemented by programmatically describing processes such as input and output of ledger data. Each of the calculation nodes in the distributed ledger system performs consensus protocol, executes such a smart contract, and updates the ledger data with the execution results.

Further, the distributed ledger technology described above is classified into several types according to its configuration. For example, there are a public type in which the distributed ledger system is configured between an unspecified large number of calculation nodes, a permission type or a consortium type in which the distributed ledger system is configured between calculation nodes in specific organizations, a private type in which the distributed ledger system is configured between calculation nodes in a specific organization, and the like.

In particular, the permission type distributed ledger is attracting attention, and it is hoped that the permission type distributed ledger will be used for inter-organizational cross-operations to improve efficiency of a business process. For example, when the permission type distributed ledger system is applied to a supply chain, it is also assumed that the overall optimization of the supply chain will be pursued such as sharing of resource information among the organizations that make up the supply chain and minimizing an inventory of suppliers according to the needs of a buyer.

However, the organizations that are participants in such a supply chain have different positions, and depending on a business relationship or the like, it is not preferable to share information among the organizations. For this reason, it is also assumed that the system is built only by the organizations with a predetermined business relationship rather than building a single distributed ledger system to which all organizations belong.

In response to such a case, a concept called "channel" for logically dividing the distributed ledger (https://hyperledger-fabric.readthedocs.io/en/release/channels.html (search date: Feb. 7, 2018)) has appeared. Further, the distributed ledger logically divided into the channel is called a sub-ledger.

In this case, the distributed ledger system is a single distributed ledger system in which the entire organization participates, and internally includes a plurality of distributed ledger subsystems sharing a predetermined sub-ledger only between specific organizations. Further, the calculation node in the distributed ledger subsystem described above executes an installed smart contract to update data of the sub-ledger in the distributed ledger subsystem.

SUMMARY

According to the channel technology, there is an advantage that it is easy to build the distributed ledger subsystem described above, but there is a problem that a scope of information sharing is limited to each distributed ledger subsystem. In this case, it is difficult to appropriately share information throughout the distributed ledger network, and the overall optimization of the supply chain is also likely to be limited.

Therefore, a structure can be also conceived in which the smart contract querying information between the distributed ledger subsystems is implemented on a predetermined node of the distributed ledger subsystem so as to be appropriately called and executed.

However, when such a smart contract is implemented on the node of each distributed ledger subsystem, it is likely that an interface coordination or the like is required among the respective smart contracts having different settings for each distributed ledger subsystem. This can lead to a significant increase in the introduction cost, which can be an introduction barrier.

In addition, when such a node issues (i.e., broadcasts) a transaction to each node of the distributed ledger subsystem along with the execution of the corresponding smart contract, there is a case in which the node on a receiving side receives a plurality of transactions with the same contents, or a case in which an issue of the transaction to the node of the distributed ledger subsystem that is not originally connected (unaccepted) fails. In this case, eventually, it would be impossible to appropriately share the information across the distributed ledger subsystem, that is, across the organization.

Therefore, an object of the present invention is to provide a technology that efficiently performs appropriate information sharing across the respective distributed ledger subsystems.

An aspect of the present invention provides a distributed ledger system constituted by a plurality of distributed ledger subsystems, wherein each of the distributed ledger subsystems includes a sub-ledger that holds ledger data shared in the distributed ledger subsystems, and a smart contract that interlocks between the distributed ledger subsystems having a common sub-ledger to perform a transaction processing related to an input and output of the ledger data, transmits a transaction request targeted for ledger data of another sub-ledger different from the common sub-ledger managed by another distributed ledger subsystem to another distributed ledger subsystem having the common sub-ledger by receiving a predetermined transaction request from a predetermined device and executing the smart contract, and replies with a transaction reply obtained from at least the another distributed ledger subsystem to the predetermined device.

Another aspect of the present invention provides a distributed ledger subsystem constituting a distributed ledger system, wherein the distributed ledger subsystem includes a sub-ledger that holds ledger data shared in the distributed ledger subsystem, and a smart contract that interlocks between the distributed ledger subsystems having a common sub-ledger to perform a transaction processing related to an input and output of the ledger data, transmits a transaction request targeted for ledger data of another sub-ledger different from the common sub-ledger managed by another distributed ledger subsystem to the another distributed ledger subsystem having the common sub-ledger by receiving a predetermined transaction request from a predetermined device and executing the smart contract, and replies with a transaction reply obtained from at least the another distributed ledger subsystem to the predetermined device.

Another aspect of the present invention provides a distributed ledger node included in a distributed ledger subsystem constituting a distributed ledger system, wherein the distributed ledger node includes a sub-ledger that holds ledger data shared in the distributed ledger subsystem to which the distributed ledger node belongs, and a smart contract that interlocks between nodes of another distributed ledger subsystem having a common sub-ledger to perform a transaction processing related to an input and output of the ledger data, transmits a transaction request targeted for ledger data of another sub-ledger different from the common sub-ledger managed by the another distributed ledger subsystem to a predetermined node of another distributed ledger subsystem having the common sub-ledger by receiving a predetermined transaction request from a predetermined device and executing the smart contract, and replies with a transaction reply obtained from at least the predetermined node of the another distributed ledger subsystem to the predetermined device.

According to the present invention, it is possible to efficiently perform appropriate information sharing across the respective distributed ledger subsystems.

BRIEF DESCRIPTION OF DRAWINGS

FIG. 5 is a diagram illustrating an example of a table managed by a distributed ledger client according to the first embodiment;

FIG. 6A is a diagram illustrating an example of a table managed by a distributed ledger node according to the first embodiment;

FIG. 6B is a diagram illustrating an example of a table managed by a distributed ledger node according to the first embodiment;

FIG. 7B is a diagram illustrating an implementation example of a smart contract according to the first embodiment;

FIG. 10 is a diagram illustrating a processing flow of the smart contract according to the first embodiment;

DETAILED DESCRIPTION OF THE EMBODIMENTS

In order to explain the embodiments, the following terms are defined in the present specification. First, a distributed ledger is a distributed database that securely shares ledger data handled between a plurality of calculation nodes that make up a distributed ledger system, that is, distributed ledger nodes. Such a distributed ledger is also referred to as a block chain.

Further, in the present specification, description will be made on a permission type (also referred to as a consortium type) among the forms of the distributed ledger system described above. In addition, the distributed ledger system uses an element technology such as a hash chain or a consensus protocol in order to share the data described above.

In addition, the distributed ledger described above is configured to include the sub-ledger shared only between specific calculation nodes among the calculation nodes that participate in the distributed ledger system. The calculation nodes sharing such a sub-ledger configure the distributed ledger subsystem. The distributed ledger system is a collection of distributed ledger subsystems.

In addition, the ledger data is data recorded in the distributed ledger (or sub-ledger). A data structure of the ledger data can include a data structure of a relational database (RDB) or a key-value store (KVS). Such a data structure can be defined by a user of the distributed ledger system (an implementer of the smart contract).

The smart contract is a program that describes processes such as input and output of the ledger data. The smart contract is installed on the distributed ledger node belonging to the distributed ledger system (or the distributed ledger subsystem) and is executed at an appropriate timing.

The distributed ledger nodes that execute the smart contract are not necessarily all nodes belonging to the distributed ledger system (or the distributed ledger subsystem), but all nodes belonging to the distributed ledger system (or the distributed ledger subsystem) update their ledger data based on the execution result of the smart contract.

In addition, the transaction is each process that each of the distributed ledger nodes described above performs by executing the smart contract while interlocking based on the consensus protocol or the like. Examples of the transaction include referencing ledger data, updating ledger data, and the like. The transaction includes an argument (a parameter of a request). Examples of the argument of the transaction include a key of data to be referenced, a key of data to be updated, and an updated value.

First Embodiment

Figure 1:
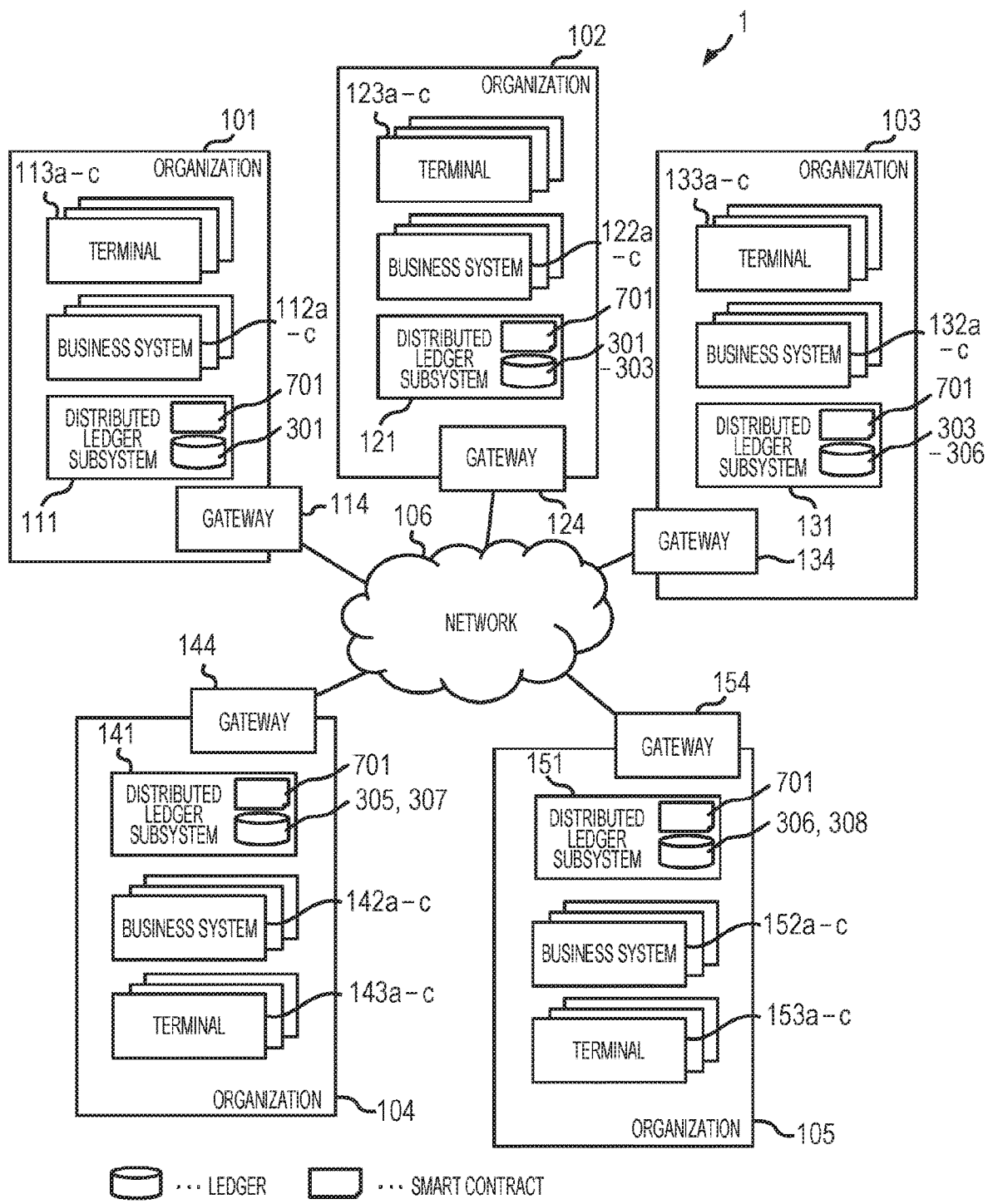
FIG. 1 is a diagram illustrating a configuration example of a distributed ledger system according to a first embodiment.

Hereinafter, a first embodiment of the present invention will be described with referent to the drawings. FIG. 1 is a diagram illustrating a configuration example of a distributed ledger system 1 according to a first embodiment.

Users of the distributed ledger system 1 illustrated in FIG. 1, that is, stakeholders are organizations 101 to 105. These organizations 101 to 105 are assumed to be, for example, buyers and suppliers that make up a supply chain.

Each of the organizations 101 to 105 has a terminal, a business system, and a distributed ledger subsystem operated by the person in charge and the like. For example, the organization 101 has a distributed ledger subsystem 111, business systems 112a to 112c, and terminals 113a to 113c. Similarly, the organization 102 has a distributed ledger subsystem 121, a business system 122, and terminals 123a to 123c. Similarly, the organization 103 has a distributed ledger subsystem 131, business systems 132a to 132c, and terminals 133a to 133c. Similarly, the organization 104 has a distributed ledger subsystem 141, business systems 142a to 142c, and terminals 143a to 143c. Similarly, the organization 105 has a distributed ledger subsystem 151, business systems 152a to 152c, and terminals 153a to 153c.

The distributed ledger subsystems of such organizations 101 to 105 can communicate with each other via an appropriate network 106 such as the Internet.

In addition, among the configurations described above, the distributed ledger subsystems 111 to 151 are subsystems that make up the distributed ledger system 1. In the present embodiment, each of the distributed ledger subsystems belongs to one of the organizations 101 to 105 described above.

Here, in order to facilitate conceptual understanding, the distributed ledger subsystems 111 to 151 are illustrated in the form of holding the distributed ledger and the smart contract. However, actually, the distributed ledger node in the distributed ledger subsystem holds such a distributed ledger or smart contract, as described below.

Further, the business systems 112a to 112c, 122a to 122c, 132a to 132c, 142a to 142c, and 152a to 152c of the respective organizations 101 to 105 among the configurations described above are the business systems used by the organizations. Specifically, it is possible to assume a system for performing an ordering and ordering reception processing of products and parts on a supply chain.

In addition, the terminals 113a to 113c, 123a to 123c, 133a to 133c, 143a to 143c, and 153a to 153c of the organizations 101 to 105 are terminals used by the persons in charge of the organizations. Such persons in charge operate the terminals of the organizations and access the distributed ledger subsystems or business systems of the organizations.

In addition, the organizations 101 to 105 include gateways 114, 124, 134, 144, and 154. Such a gateway is a communication control device between the distributed ledger subsystem in the organization and a distributed ledger subsystem of another organization.

<For Concrete Concept of Distributed Ledger System>

Figure 2:
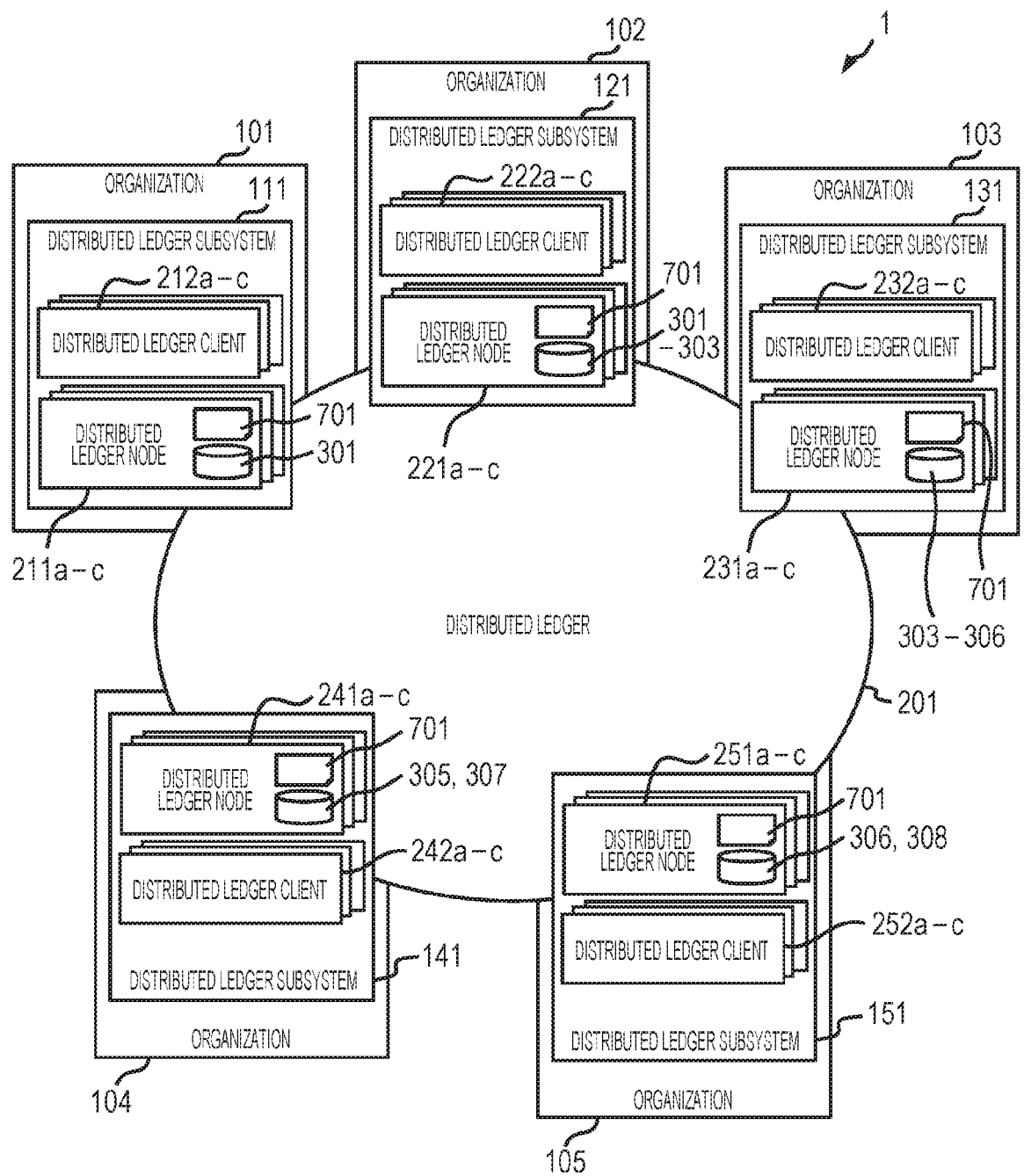
FIG. 2 is a diagram illustrating a concept example of the distributed ledger system according to the first embodiment.

When the concept of the distributed ledger system 1 described above is illustrated from the viewpoint of the distributed ledger, the configuration of FIG. 2 can be assumed. The example of FIG. 2 illustrates a case in which a single distributed ledger 201 includes (sub-ledgers of) a plurality of distributed ledger subsystems 111 to 151.

The distributed ledger system 1 includes the following components. That is, the distributed ledger system 1 includes distributed ledger nodes 211a to 211c, 221a to 221c, 231a to 231c, 241a to 241c, and 251a to 251c, and distributed ledger clients 212a to 212c, 222a to 222c, 232a to 232c, 242a to 242c, and 252a to 252c.

Among these, the distributed ledger nodes 211a to 211c, 221a to 221c, 231a to 231c, 241a to 241c, and 251a to 251c have ledger data constituting the distributed ledger 201.

In addition, the distributed ledger nodes 211a to 211c, 221a to 221c, 231a to 231c, 241a to 241c, and 251a to 251c manage and execute a program of the smart contract that performs an input and output processing (transaction) of the ledger data that each distributed ledger node has.

The distributed ledger 201 is realized by each of the plurality of distributed ledger nodes having the ledger data and executing the smart contract.

The distributed ledger clients 212a to 212c, 222a to 222c, 232a to 232c, 242a to 242c, and 252a to 252c request the transaction to the distributed ledger nodes 211a to 211c, 221a to 221c, 231a to 231c, 241a to 241c, and 251a to 251c.

Figure 3A:
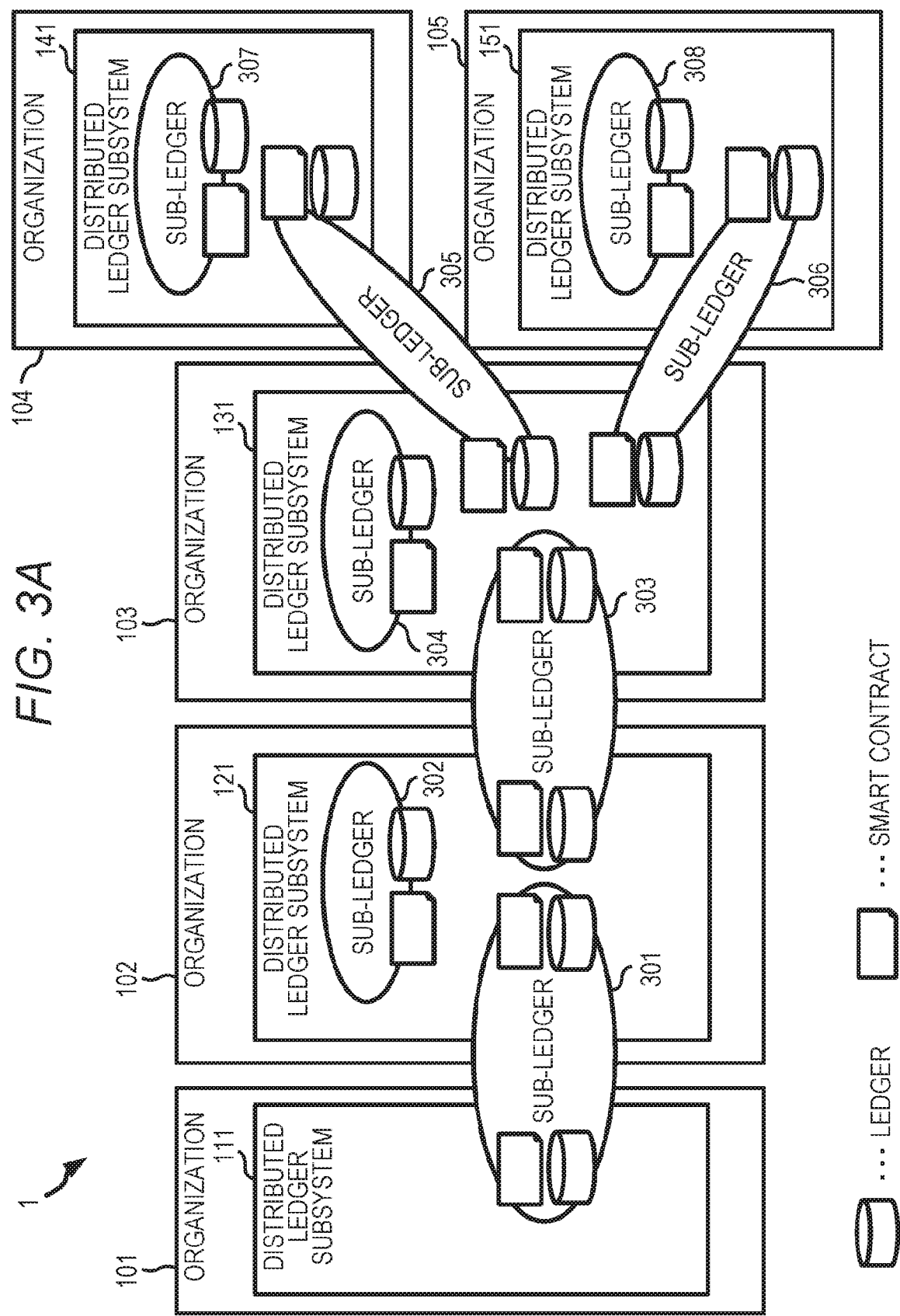
FIG. 3A is a diagram illustrating a relationship example in a subsystem granularity of the distributed ledger system according to the first embodiment.
Figure 3B:
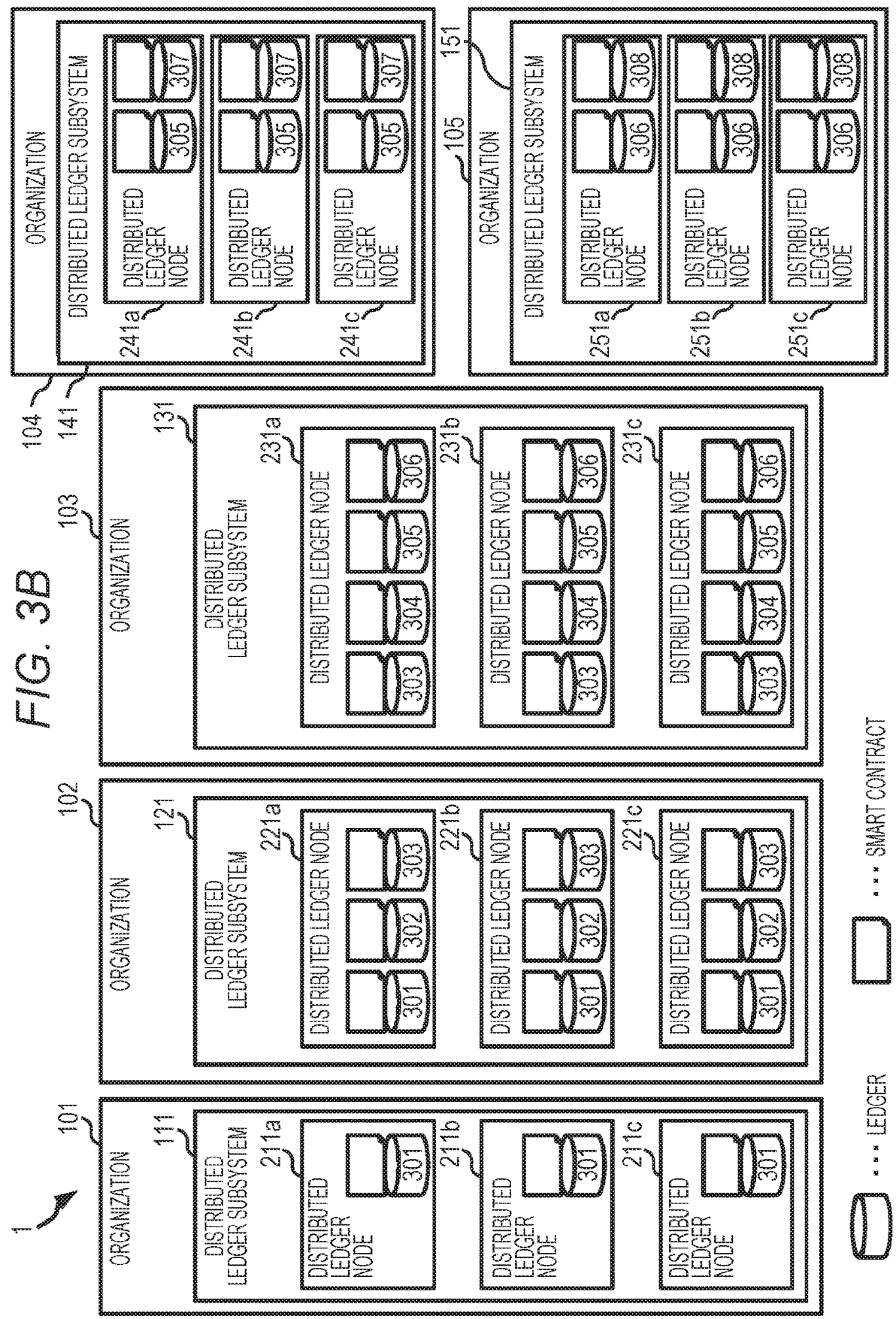
FIG. 3B is a diagram illustrating a relationship example in a distributed ledger node granularity of the distributed ledger system according to the first embodiment.

Meanwhile, when the concept of the distributed ledger system 1 described above is illustrated from the viewpoint of the distributed ledger subsystem, the configurations of FIGS. 3A and 3B can be assumed. FIGS. 3A and 3B are diagrams illustrating an example of a logical relationship between sub-ledgers, in the distributed ledger system using the sub-ledgers.

Sub-ledgers 301 to 308 represent the distributed ledgers shared by the distributed ledger subsystem which is constituted by a specific limited distributed ledger node among the components of the distributed ledger system 1.

As described in FIG. 2, an entity of the ledger data and smart contract is managed by the distributed ledger nodes 211a to 211c, 221a to 221c, 231a to 231c, 241a to 241c, and 251a to 251c. Meanwhile, describing the sub-ledgers 301 to 308 using the distributed ledger nodes 211a to 211c, 221a to 221c, 231a to 231c, 241a to 241c, and 251a to 251c has high complexity due to a large number of components.

Therefore, in FIG. 3A, a description is first made in a granularity of the distributed ledger subsystems 111 to 151. Thereafter, in FIG. 3B, a description is made in a granularity of the distributed ledger nodes 211a to 211c, 221a to 221c, 231a to 231c, 241a to 241c, and 251a to 251c.

FIG. 3A is a diagram describing a logical relationship of the sub-ledgers 301 to 308 in the granularity of the distributed ledger subsystems 111 to 151.

The sub-ledger 301 is shared between the distributed ledger subsystems 111 and 121. In addition, the sub-ledger 302 is shared in the distributed ledger subsystem 121.

In addition, the sub-ledger 303 is shared between the distributed ledger subsystems 121 and 131. In addition, the sub-ledger 304 is shared in the distributed ledger subsystem 131.

In addition, the sub-ledger 305 is shared between the distributed ledger subsystems 131 and 141. In addition, the sub-ledger 306 is shared between the distributed ledger subsystems 131 and 151.

In addition, the sub-ledger 307 is shared in the distributed ledger subsystem 141. In addition, the sub-ledger 308 is shared in the distributed ledger subsystem 151.

As described above, the sub-ledgers are shared between specific distributed ledger subsystems (or in a single distributed ledger subsystem).

Meanwhile, FIG. 3B is a diagram describing a configuration of the sub-ledgers 301 to 308 described above in the granularity of the distributed ledger nodes 211a to 211c, 221a to 221c, 231a to 231c, 241a to 241c, and 251a to 251c.

Among these, the sub-ledger 301 is shared by the distributed ledger nodes 211a to 211c and 221a to 221c. In addition, the sub-ledger 302 is shared by the distributed ledger node 221a to 221c.

In addition, the sub-ledger 303 is shared by the distributed ledger nodes 221a to 221c and 231a to 231c. In addition, the sub-ledger 304 is shared by the distributed ledger node 231a to 231c.

In addition, the sub-ledger 305 is shared by the distributed ledger nodes 231a to 231c and 241a to 241c. In addition, the sub-ledger 306 is shared by the distributed ledger nodes 231a to 231c and 251a to 251c.

In addition, the sub-ledger 307 is shared by the distributed ledger node 241a to 241c. In addition, the sub-ledger 308 is shared by the distributed ledger node 251a to 251c.

Further, it is not necessary for all nodes in the distributed ledger subsystem to hold the same sub-ledger.

<Configuration of Distributed Ledger Subsystem>

Figure 4:
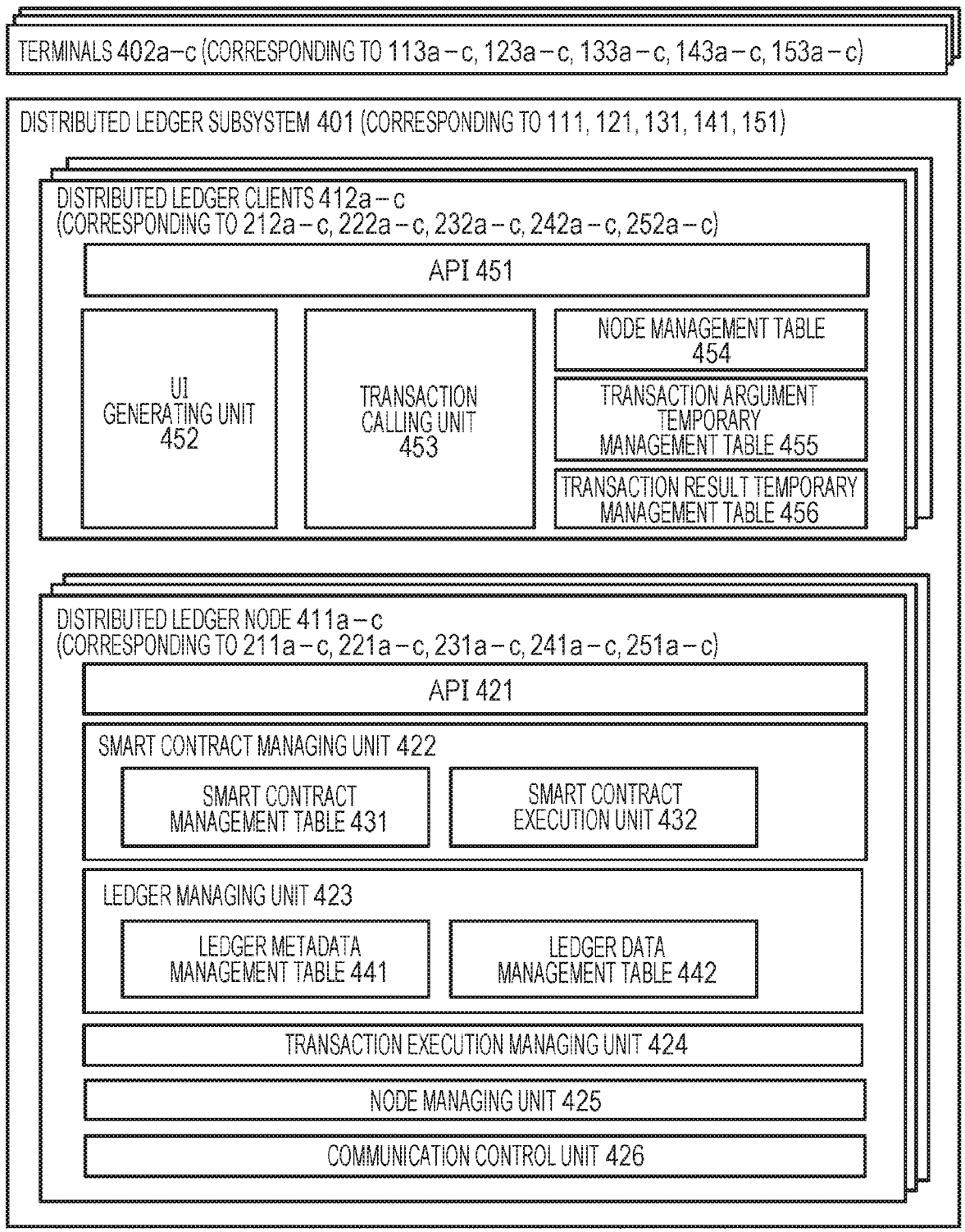
FIG. 4 is a diagram illustrating a configuration example of a distributed ledger subsystem according to the first embodiment.

Subsequently, a configuration of the distributed ledger subsystems 111 to 151 described above will be described with reference to FIG. 4. In FIG. 4, a distributed ledger subsystem 401 corresponds to the distributed ledger subsystems 111 to 151. Hereafter, in order to describe the necessary common function among the respective configurations of the distributed ledger subsystems 111 to 151, the description is commonly made by mainly using reference numeral of 401.

In addition, terminals 402a to 402c in FIG. 4 correspond to the terminals 113a to 113c, 123a to 123c, 133a to 133c, 143a to 143c, and 153a to 153c. Hereinafter, in order to the necessary common function among the respective configurations of the terminals 113a to 113c, 123a to 123c, 133a to 133c, 143a to 143c, and 153a to 153c, the description is commonly made by mainly using reference numeral of 402.

In addition, distributed ledger nodes 411a to 411c in FIG. 4 correspond to the distributed ledger nodes 211a to 211c, 221a to 221c, 231a to 231c, 241a to 241c, and 251a to 251c. Hereinafter, when the necessary common function among the respective configurations of the distributed ledger nodes 211a to 211c, 221a to 221c, 231a to 231c, 241a to 241c, and 251a to 251c is described, the description is commonly made by mainly using reference numeral of 411.

In addition, distributed ledger clients 412a to 412c in FIG. 4 correspond to the distributed ledger clients 212a to 212c, 222a to 222c, 232a to 232c, 242a to 242c, and 252a to 252c. Hereinafter, when the necessary common function among the respective configurations of the distributed ledger clients 212a to 212c, 222a to 222c, 232a to 232c, 242a to 242c, and 252a to 252c is described, the description is commonly made by mainly using reference numeral of 412.

A configuration of the distributed ledger node 411 in the distributed ledger subsystem 401 having the above-mentioned configuration will be described. Components of the distributed ledger node 411 include an application programming interface (API) 421, a smart contract managing unit 422, a ledger managing unit 423, a transaction execution managing unit 424, a node managing unit 425, and communication control unit 426.

Among these, the API 421 is an interface for receiving and replying to a request about a transaction execution or the like from other components. An implementation example of the API 421 includes WebAPI.

In addition, the smart contract managing unit 422 is a managing unit for holding and managing a program of the smart contract and executing the program.

In addition, the ledger managing unit 423 is a managing unit for holding and managing the sub-ledger and managing ledger data in the sub-ledger.

In addition, the transaction execution managing unit 424 is a managing unit for managing an execution status of a processing of the smart contract. The transaction execution managing unit 424 executes the smart contract while interlocking based on the consensus protocol or the like between the distributed ledger nodes.

In addition, the node managing unit 425 is a managing unit for managing information (e.g., its own node ID) of the distributed ledger node.

In addition, the communication control unit 426 is a functional unit for controlling communication with other components. The protocol of communication includes Transmission Control Protocol/Internet Protocol (TCP/IP).

As described above, among the components of the distributed ledger node 411, the smart contract managing unit 422 includes a smart contract management table 431 and a smart contract executing unit 432.

Among these, the smart contract management table 431 manages information of the smart contract which is usable for each of the sub-ledgers. The detail of the smart contract management table 431 will be described below with reference to FIGS. 6A and 6B.

In addition, the smart contract executing unit 432 is a functional unit for executing a processing the smart contract.

In addition, among the components of the distributed ledger node 411, the ledger managing unit 423 includes a ledger metadata management table 441 and a ledger data management table 442.

Among these, the ledger metadata management table 441 manages metadata of the sub-ledgers managed by the distributed ledger node 411. The detail of the ledger metadata management table 441 will be described below with reference to FIGS. 6A and 6B.

In addition, the ledger data management table 442 is a table that manages ledger data stored in an individual sub-ledger. An example of the ledger data stored in the ledger data management table 442 will be described below with reference to FIGS. 6A and 6B. Hereinabove, the configuration of the distributed ledger node 411 has described.

<Configuration of Distributed Ledger Client>

Subsequently, a configuration of a distributed ledger client 412 will be described. Components of the distributed ledger client 412 includes an API 451, a user interface (UI) generating unit 452, a transaction calling unit 453, a node management table 454, a transaction argument temporary management table 455, and a transaction result temporary management table 456.

Among these, the API 451 is an interface for receiving processing requests from other components and returning the processing results. An implementation example of the API 451 includes WebAPI. In addition, an example of the interface provided by the API 451 includes an interface that requests a generation of the transaction to the distributed ledger node. In addition, another example of the interface provided by the API 451 includes an interface that returns the result of the transaction returned by the distributed ledger node.

In addition, the UI generating unit 452 is a functional unit that generates a UI for displaying the execution result of the processing or the like for the other components such as the terminal 402. The detail of the UI generating unit 452 will be described below with reference to FIG. 14.

In addition, the transaction calling unit 453 is a functional unit that transmits a transaction request to the distributed ledger node 411 and receives the result of the transaction (transaction reply).

In addition, the node management table 454 is a table that manages information on the distributed ledger node. The detail of the node management table 454 will be described below with reference to FIG. 5.

In addition, the transaction argument temporary management table 455 is a table that temporarily manages arguments (parameters of the request) of the transaction transmitted to the distributed ledger node 411. The detail of the transaction argument temporary management table 455 will be described below with reference to FIG. 5.

In addition, the transaction result temporary management table 456 is a table that temporarily manages transaction execution results (response, transaction reply) received from the distributed ledger node 411. The detail of the transaction result temporary management table 456 will be described below with reference to FIG. 5. Hereinabove, the configuration of the distributed ledger client 412 has described.

<Table Managed by Distributed Ledger Client>

FIG. 5 is a diagram illustrating an example of a table managed by the distributed ledger client 412. In FIG. 5, values listed in the table represent examples of the distributed ledger client belonging to the distributed ledger subsystem 131.

First, the node management table 454 is a table that manages information on the distributed ledger node. Components of the node management table 454 include a node 511, an endpoint 512, a ledger 513, and a smart contract 514.

Among these, the node 511 is an identifier of a node accessed by the distributed ledger client 412.

In addition, the endpoint 512 is an endpoint of the node 511 described above, and includes various identifiers such as a host name, an IP address, and a port number of TCP.

In addition, the ledger 513 is an identifier of the sub-ledger in the distributed ledger subsystem to which the node 511 described above belongs.

In addition, the smart contract 514 is an identifier of a smart contract that the node 511 described above can execute.

Subsequently, the transaction argument temporary management table 455 is a table that temporarily manages arguments (parameters of the request) of the transaction transmitted to the distributed ledger node 411.

Components of the transaction argument temporary management table 455 include a transaction ID 521, a ledger 522, a smart contract 523, a node 524, authentication information 525, a main resource ID 526, a number 527, a price 528, a lead time 529, a main resource ID 531, a sub resource ID 532, and a number 533.

Among these, the transaction ID 521 is an identifier for uniquely identifying the transaction executed throughout the distributed ledger system 1.

In addition, the ledger 522 is an identifier of a sub-ledger of the distributed ledger subsystem of a transaction execution target.

In addition, the smart contract 523 is an identifier of a smart contract of the transaction execution target.

In addition, the node 524 is an identifier of one or more distributed ledger nodes that execute the transaction.

In addition, the authentication information 525 is authentication information that is required when requesting execution of a transaction on the distributed ledger node.

Subsequent transaction arguments are different depending on the processing content of the smart contract, or the processing (inquiry content or the like) that the user wishes to execute.

For example, the main resource ID 526 is an identifier of the resource to be queried by the smart contract, such as, for example, identification information of a product to be inquired for inventory information in the supply chain.

In addition, the number 527 is the number of resources to be queried described above. In addition to this, the price 528 and the lead time 529 may also be included in the transaction argument.

In addition, the main resource ID 531, the sub resource ID 532, and the number 533 are information that components of the main resource corresponding to a higher hierarchical structure are represented in the format of the sub resources of a lower hierarchical structure constituting the main resource and the number thereof, and may also be included in the transaction arguments as well.

In addition, the transaction result temporary management table 456 is a table that temporarily manages transaction execution results (response, transaction reply) received from the distributed ledger node 411.

Components of the transaction result temporary management table 456 include a transaction ID 541, a number 542, a price 543, and a lead time 544.

Among these, the transaction ID 541 is an identifier for uniquely identifying the transaction.

Subsequent components are different depending on the processing content of the smart contract, or the processing (inquiry content or the like) that the user wishes to execute. For example, the number 542 is the result of execution of a transaction that queries the available number of sub resources (e.g., parts) corresponding to a predetermined sub resource ID. Similarly, the price 543 is the result of execution of a transaction that queries for a price of the sub resource. In addition, the lead time 544 is the result of execution of a transaction that queries for a lead time of the sub resource.

<Table Managed by Distributed Ledger Node>

FIG. 6A and 6B are diagrams illustrating an example of a table managed by the distributed ledger node 411. In FIGS. 6A and 6B, values listed in the table represent examples of the distributed ledger node belonging to the distributed ledger subsystem 131.

Among these, the smart contract management table 431 is a table that manages information of the smart contract which is usable for each of the sub-ledgers.

Components of the smart contract management table 431 include a ledger 611 and a smart contract 612. Among these, the ledger 611 is an identifier of the sub-ledger. In addition, the smart contract 612 is an identifier of a smart contract that is executable for each of the sub-ledgers.

In addition, the ledger metadata management table 441 is a table that manages metadata of the sub-ledgers managed by the distributed ledger node 411. Components of the ledger metadata management table 441 include a ledger 621, a node 622, and a data type 623.

Among these, the ledger 621 is an identifier of the sub-ledger. In addition, the node 622 is an identifier of the distributed ledger node that shares the sub-ledger. In addition, the data type 623 is an identifier for a type of ledger data stored in the sub-ledger.

In addition, the ledger data management table 442 is a table that manages ledger data stored in an individual sub-ledger. An example of the ledger data stored in such a ledger data management table 442 will be described below.

For example, the resource information 601 is ledger data relating to the resource information in the sub-ledger 303 of the respective sub-ledgers in the distributed ledger system 1. Components of the resource information 601 include a resource ID 631 and a resource holding amount 632.

Among these, the resource ID 631 is an identifier of the resource (e.g., product). In addition, the resource holding amount 632 is a holding amount of the resource (for example, the number of inventories). Further, in addition to this, the resource information 601 may include information such as a price 633 or a lead time 634 of the resource.

In addition, the resource information 602 is ledger data relating to the resource information in the sub-ledger 305 of the respective sub-ledgers in the distributed ledger system 1. Components of the resource information 602 include a resource ID 635 and a resource holding amount 636.

Among these, the resource ID 635 is an identifier of the resource (e.g., product). In addition, the resource holding amount 636 is a holding amount of the resource (for example, the number of inventories). Further, in addition to this, the resource information 602 may include information such as a price 637 or a lead time 638 of the resource.

In addition, the resource information 603 is ledger data relating to the resource information in the sub-ledger 306 of the respective sub-ledgers in the distributed ledger system 1. Components of the resource information 603 include a resource ID 639 and a resource holding amount 640.

Among these, the resource ID 639 is an identifier of the resource (e.g., product). In addition, the resource holding amount 640 is a holding amount of the resource (for example, the number of inventories). Further, in addition to this, the resource information 603 may include information such as a price 641 or a lead time 642 of the resource.

In addition, ledger information 604 for each node is, for example, ledger data that manages information relating to the sub-ledger of a reference destination for each node, in the sub-ledger 303. Components of the ledger information 604 for each node include an organization 651, a node 652, and a ledger 653.

Among these, the organization 651 is an identifier of an organization. In addition, the node 652 is an identifier of the distributed ledger node. In addition, the ledger 653 is an identifier of the sub-ledger to which a node designated by the organization 651 and the node 652 described above can be referred.

In addition, adjacent node information 605 is, for example, ledger data that manages information on a transmission destination of the transaction request, that is, a candidate node of a recursive inquiry destination, in the sub-ledger 304.

Components of the adjacent node information 605 include a resource ID 661, an organization 662, a ledger 663, a smart contract 664, and a node 665.

Among these, the resource ID 661 is an identifier of a resource that is an inquiry target (e.g., a product). In addition, the organization 662 is an identifier of an organization that handles the resource. In addition, the ledger 663 is an identifier of the sub-ledger that holds the ledger data relating to the resource. In addition, the smart contract 664 is an identifier of a smart contract executed at the time of inquiry. In addition, the node 665 is an identifier of a candidate node that executes the transaction relating to the resource ID 661 described above.

<Implementation Example of Smart Contract>

Figure 7A:
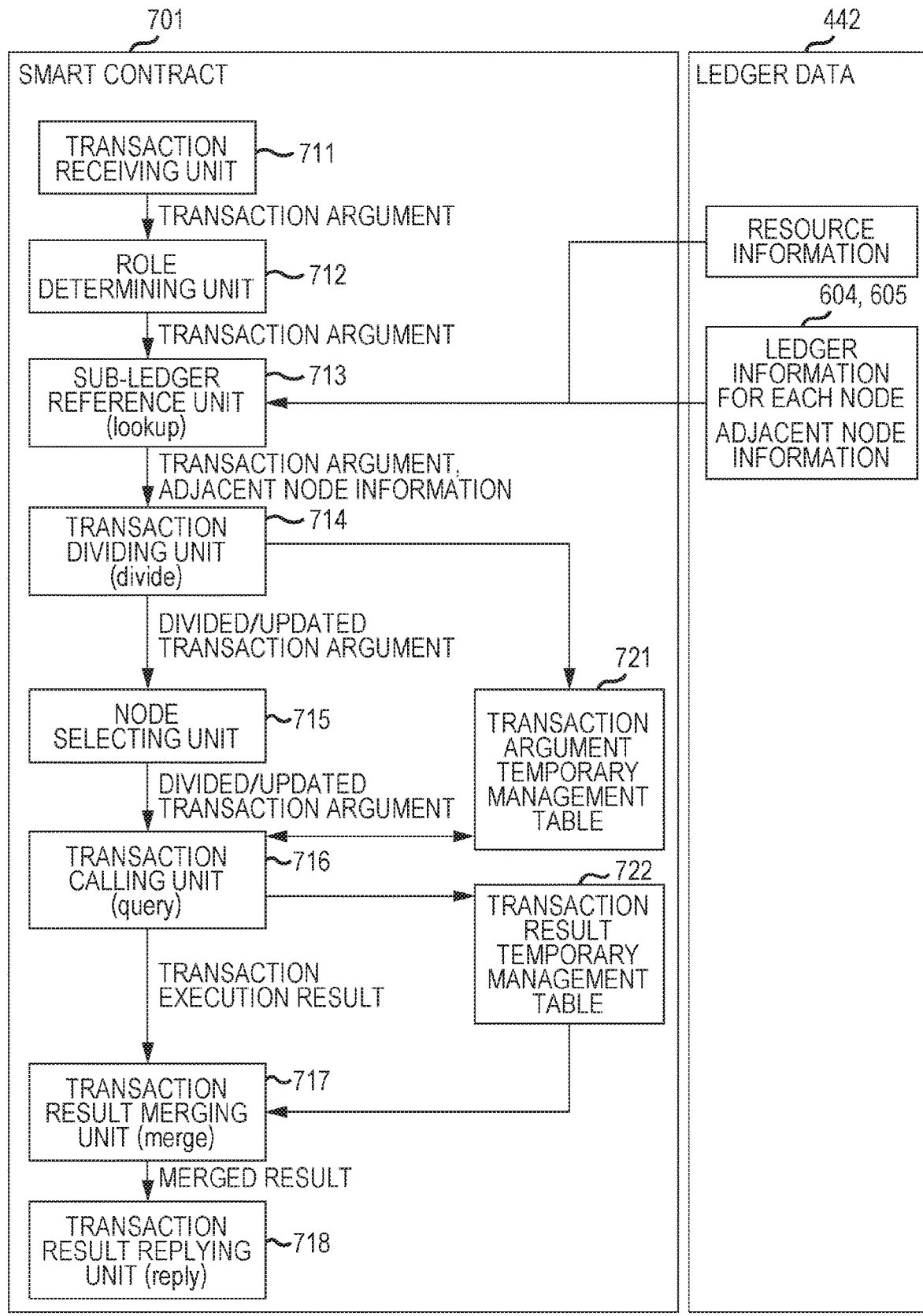
FIG. 7A is a diagram illustrating an implementation example of a smart contract according to the first embodiment.

Subsequently, smart contracts held by the distributed ledger nodes, respectively, will be described. FIG. 7A is a diagram illustrating an implementation example of a smart contract 701 according to the first embodiment. The smart contract 701 illustrated herein is managed in the smart contract management table 431 (FIG. 4).

Components of the smart contract 701 include a transaction receiving unit 711, a role determining unit 712, a sub-ledger reference unit 713, a transaction dividing unit 714, a node selecting unit 715, a transaction calling unit 716, a transaction result merging unit 717, a transaction result replying unit 718, a transaction argument temporary management table 721, and a transaction result temporary management table 722.

Among these, the transaction receiving unit 711 is, for example, a functional unit that receives an execution request (a transaction request) of the transaction from predetermined devices such as the terminals 113 to 153.

In addition, the role determining unit 712 is a functional unit that the distributed ledger node executing the transaction determines its own role.

In addition, the sub-ledger reference unit 713 is a functional unit that performs a processing relating to an input or an output for the sub-ledger.

In addition, the transaction dividing unit 714 is a functional unit that divides the transaction received by the transaction receiving unit 711 into sub-transactions.

In addition, the node selecting unit 715 is a functional unit that selects the distributed ledger node of the execution target of the sub-transaction, for individual sub-transactions divided by the transaction dividing unit 714.

In addition, the transaction calling unit 716 is a functional unit that transmits a transaction execution request of the sub-transaction and receives the transaction execution result (transaction reply) to and from the distributed ledger node selected by the node selecting unit 715.

In addition, the transaction result merging unit 717 is a functional unit that aggregates the execution results of the individual sub-transactions divided by the transaction dividing unit 714.

In addition, the transaction result replying unit 718 is a functional unit that replies to the execution result of the transaction (the transaction result merging unit 717 aggregates the execution results of the sub-transactions) with respect to a call source of the transaction received by the transaction receiving unit 711.

In addition, the transaction argument temporary management table 721 is a table that temporarily manages arguments (parameters of the request) of the sub-transaction transmitted to the distributed ledger node 411. Components of the transaction argument temporary management table 721 are the same as the components of the transaction argument temporary management table 455 (see FIG. 5).

In addition, the transaction result temporary management table 722 (FIG. 7B) is a table that temporarily manages an execution status and an execution result of the transaction (response, transaction reply) generated by the smart contract 701.

Components of the transaction result temporary management table 722 include a transaction ID 731, a transaction internal ID 732, a sub resource ID 733, a number 734, a price 735, and a lead time 736.

Among these, the transaction ID 731 is an identifier for uniquely identifying the transaction executed throughout the distributed ledger system 1.

In addition, the transaction internal ID 732 is an identifier for managing a progress situation of individual transactions executed recursively.

Subsequent components are different depending on the processing content of the smart contract, or the processing (inquiry content or the like) that the user wishes to execute. For example, the sub resource ID 733 is a resource ID of a query target in the transactions divided in units of sub resource. In addition, the number 734 is the result obtained by executing the transaction that queries the available number of specific sub resource IDs. In addition to this, the present table may include a price 735, a lead time 736, and the like (the same as FIG. 5).

Further, in FIG. 7, symbols such as "lookup", "divide", "query", "merge", and "reply" are assigned to some functional units. These symbols are used in a call relationship diagram of FIG. 11 and a sequence diagram of FIG. 13, which will be described below.

<Example of Overall Processing Flow>

Figure 8:
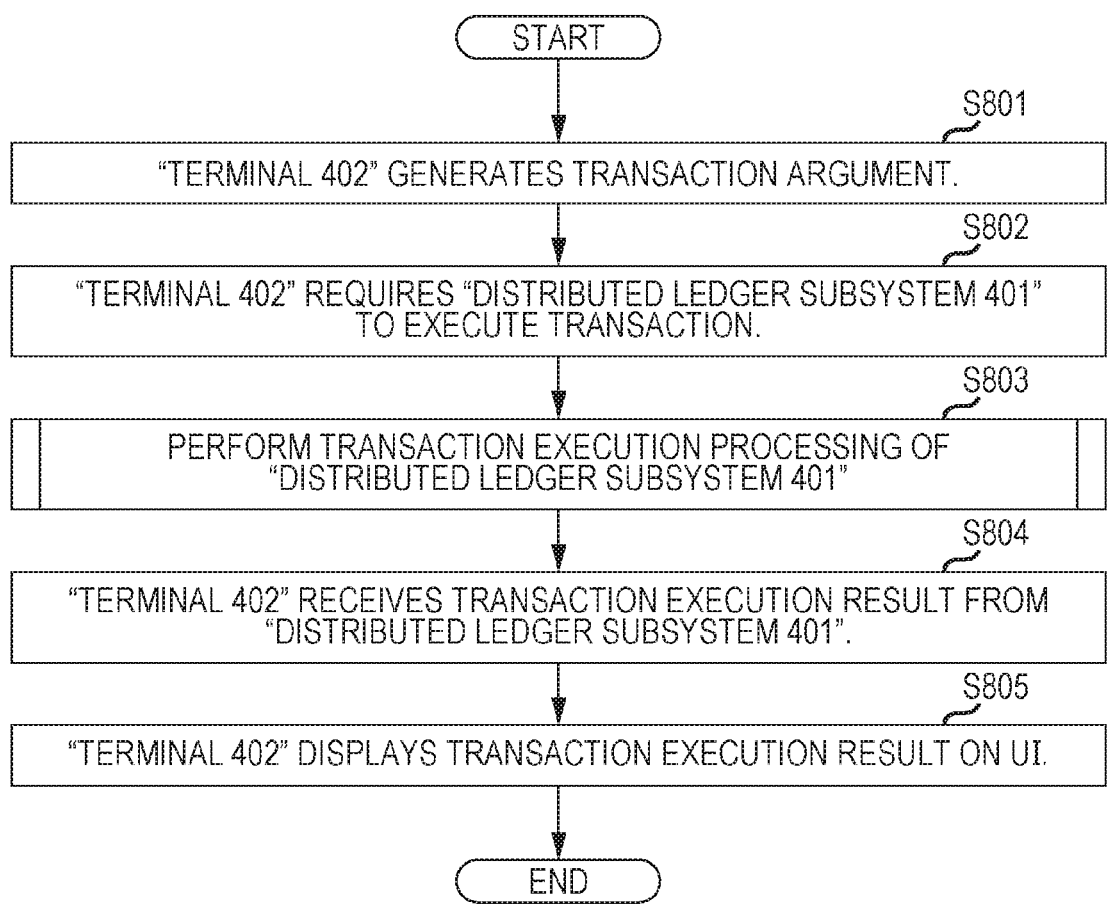
FIG. 8 is a diagram illustrating an overall processing flow example in the distributed ledger system according to the first embodiment.

FIG. 8 is a diagram illustrating an example of an overall processing flow according to the first embodiment. Here, the terminal 402 first generates the transaction arguments (S801). It is assumed that the generated transaction arguments are, for example, values (the respective items of the transaction argument temporary management table 455 of FIG. 5) such as the transaction ID, the sub-ledger to be inquired for inventory information, and the resource ID of the product or the part that are input to the terminal 402 by the user of the organization.

Next, the terminal 402 described above requests the distributed ledger subsystem 401 to execute the transaction (transaction request) next to the generation of the transaction arguments described above (S802).

Meanwhile, the distributed ledger subsystem 401 receiving the request performs a transaction execution (S803). The details of the above-mentioned step will be described below with reference to FIG. 9.

Subsequently, the terminal 402 described above receives a transaction execution result (transaction reply) from the distributed ledger subsystem 401 that performs the transaction execution processing described above (S804).

Finally, the terminal 402 described above displays the transaction execution result obtained in S804 on the UI on an output device such as a display (S805), and terminates the processing.

<Transaction Execution Processing in Distributed Ledger Subsystem>

Figure 9:
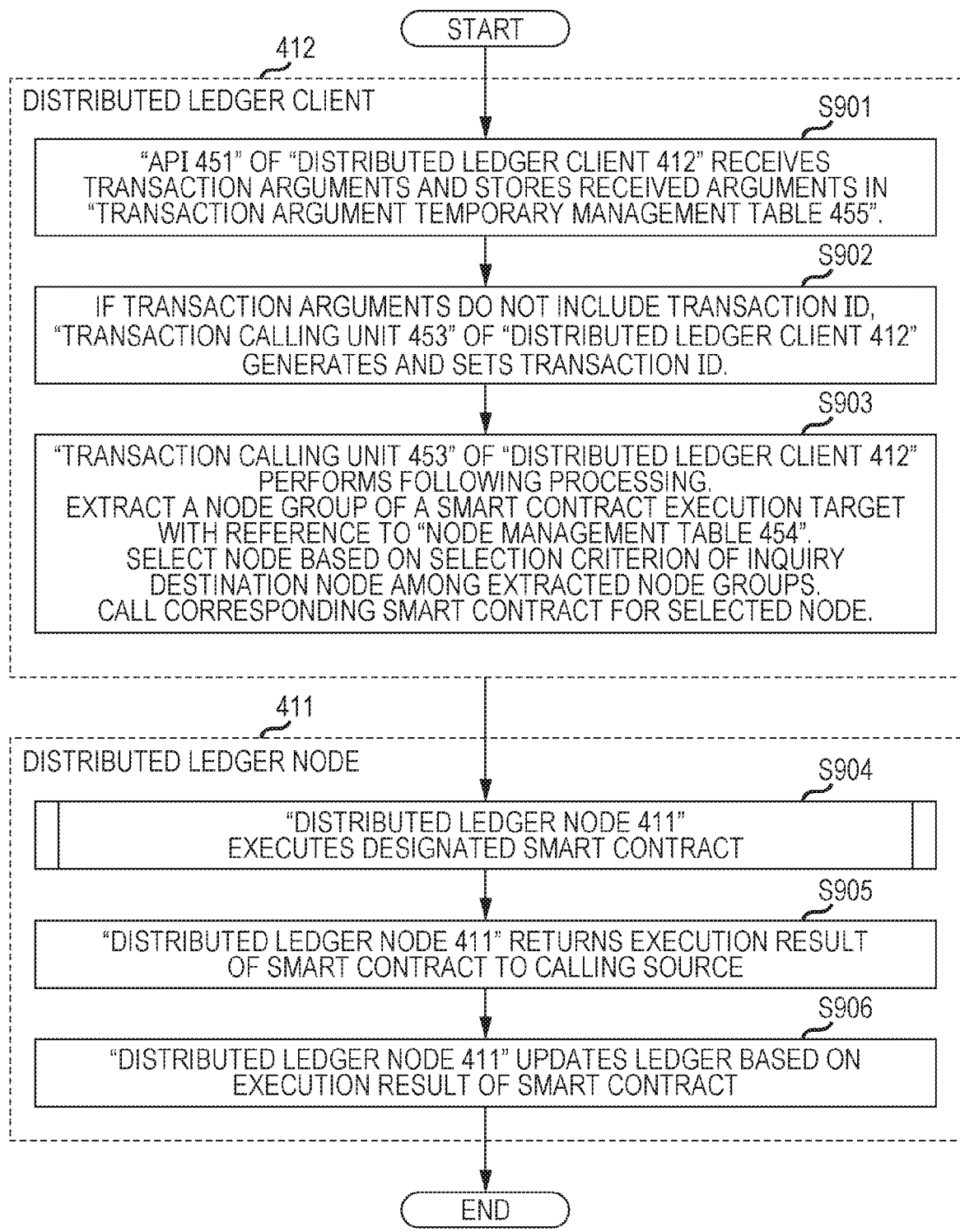
FIG. 9 is a diagram illustrating a processing flow example in the distributed ledger subsystem according to the first embodiment.

Subsequently, the details of the transaction execution processing in step S803 in the flow described above, that is, the distributed ledger subsystem will be described. FIG. 9 is a diagram illustrating an example of a processing flow corresponding to the transaction execution processing (S803) of the distributed ledger subsystem.

In this case, first, the API 451 of the distributed ledger client 412 receives the transaction arguments together with the request of the transaction execution from the terminal 402 described above, and stores the transaction arguments in the transaction argument temporary management table 455 (S901).

Next, if the transaction arguments received in S901 do not include the transaction ID, the transaction calling unit 453 of the distributed ledger client 412 generates the transaction ID and sets the transaction ID to the transaction arguments (S902). As a method of generating the transaction ID, an appropriate method such as using a general random number generation function or simply incrementing a value of an existing transaction ID may be used.

Subsequently, the transaction calling unit 453 of the distributed ledger client 412 performs the following processings (S903). First, the transaction calling unit 453 extracts a node of the distributed ledger subsystem sharing the sub-ledger (e.g., a node that is not the distributed ledger node of the distributed ledger subsystem to which the transaction calling unit 453 belongs among the distributed ledger nodes 231*a* to 231*c* and 241*a* to 241*c*), as a candidate node group of a smart contract execution target, by referring to, for example, the node management table 454 (FIG. 5) with a value of the ledger 522 indicated by the transaction argument described above, that is, a value of the sub-ledger (e.g., the sub-ledger 305). In addition, the transaction calling unit 453 selects the node based on a selection criterion of a predetermined inquiry destination node, among the extracted candidate groups. The selection criterion of the inquiry destination node can include an optional active node or a node that a response time for the most recent transaction is short among the candidate node groups (of course, the distributed ledger client 412 manages and holds history information for a response time for each of the transactions). Next, the transaction calling unit 453 calls the corresponding smart contract for the selected inquiry destination node (at this time, if necessary, obtains authentication information required for requesting the execution of the smart contract to the call destination node by an appropriate method, and set the authentication information to the transaction arguments).

Thereafter, the distributed ledger node 411, which is the inquiry destination node described above, executes the smart contract requested from the distributed ledger client 412 (S904). The details of the above-mentioned step will be described below with reference to FIG. 10.

Subsequently, the distributed ledger node 411 returns an execution result (reply) of the smart contract executed in S904 to the distributed ledger client 412 described above, which is the calling source (S905).

Finally, the distributed ledger node 411 updates its own sub-ledger based on the execution result of the smart contract described above (S906), and terminates the processing.

<Execution of Smart Contract in Distributed Ledger Node>

Subsequently, the details of the processing of step S904 by the distributed ledger node 411 in the flow described above will be described with reference to FIG. 10.

In this case, first, the transaction receiving unit 711 in the smart contract 701 of the distributed ledger node 411 acquires the transaction argument described above from the distributed ledger client 412 (S1001).

Next, in S1002, the role determining unit 712 of the smart contract 701 refers to its own node ID, that is, a node ID of the distributed ledger node 411 that holds the corresponding smart contract 701, for example, in the node managing unit 425. In addition, the role determining unit 712 determines its own role. The node ID referred here is used in step S1004 described below.

In addition, as a method of determining the role described above, it is determined whether the distributed origin node is a call source or a call destination from a call relationship of the transaction (of course, if the transaction is a transaction issued by the distributed origin node itself, the distributed ledger node is the call source, and if the transaction is a transaction issued by another distributed ledger node, the distributed ledger node is the call destination). In addition, the distributed ledger node determines whether it is a leader node or not. Here, if the distributed ledger node is the transaction execution target (e.g., the leader node of the call destination), the distributed ledger node continues to perform the subsequent processing. The role determination processing is not necessarily required if the call source node can precisely specify an appropriate call destination every time.

Next, the sub-ledger reference unit 713 of the smart contract 701 refers to a value of the resource holding amount 632 in the resource information 601 (FIG. 6B) to specify a resource amount, for the "main resource ID" among the transaction arguments obtained in S1001 (S1003).

Subsequently, in S1004, the sub-ledger reference unit 713 of the smart contract 701 refers to the ledger information 604 (FIG. 6B) for each node to acquire an identifier of its own sub-ledger corresponding to its own node ID (obtained in S1002). In addition, the sub-ledger reference unit 713 refers to the adjacent node information 605 (FIG. 6B) corresponding to the acquired identifier (e.g., 304) of the sub-ledger. Here, the information to be referred is at least a value of each of the ledger 633 (an identifier of the ledger of the inquiry destination), the smart contract 664 (an identifier of the smart contract of the inquiry destination), and the node 665 (an identifier of the adjacent node of the inquiry destination).

Next, the transaction dividing unit 714 of the smart contract 701 extracts a value of the sub resource ID 532 and acquires a sub resource ID group, among the transaction arguments obtained in S1001 (S1005). Further, the sub resource may have the same ID as the main resource.

Hereinafter, the following processing (S1006) is executed for each sub resource ID in the sub resource ID group acquired in S1005. Further, if there is no sub resource of the call target, the following processing is not performed.

First, the node selecting unit 715 of the smart contract 701 selects the node of the inquiry destination based on the selection criterion of a predetermined inquiry destination node from the node 665 of the adjacent node information 605 referred to in step S1004, that is, the distributed ledger node (S1007). The selection criterion of the inquiry destination node can include an optional active node or a node that a response time is short among the candidate node groups.

Subsequently, the transaction calling unit 716 of the smart contract 701 sets the identifier of the ledger of the inquiry destination (which is referred to in S1004, hereinafter, the same) to an area of the ledger 522, sets the identifier of the smart contract of the inquiry destination to an area of the smart contract 523, sets the identifier of the selected adjacent node to an area of the node 524, sets authentication information for requesting the transaction for the selected adjacent node to an area of the authentication information 525, and sets the sub resource ID of the inquiry target to an area to the main resource ID 526, respectively, among the transaction arguments (S1008). At this time, if necessary, the authentication information required for requesting the smart contract execution to the call destination node is acquired by an appropriate method.

Next, the transaction calling unit 716 of the smart contract 701 requires the distributed ledger subsystem 401 of the inquiry destination to execute the transaction (S1009). For the required transaction, an execution status is managed by using the transaction result temporary management table 722 (FIG. 7B). Further, if an appropriate call destination node is not found, this step (S1009) and next step (S1010) are not executed.

Subsequently, the transaction calling unit 716 of the smart contract 701 receives a transaction execution result from the distributed ledger subsystem 401 described above (S1010). The received result is added to the transaction result temporary management table 722.

The above processings (S1007 to S1010) are performed for each "sub resource ID" among the transaction arguments (S1011).

Thereafter, the transaction result merging unit 717 of the smart contract 701 aggregates the transaction execution results for each sub resource ID obtained in the steps up to now. In addition, the transaction result merging unit 717 merges the aggregated transaction result with its own resource information referred to in step S1003 (S1012).

The aggregation of the transaction execution results for each sub resource ID includes calculating the maximum number (if necessary, the prices, the lead time, or the like) of main resources (e.g., products) that can be realized by combining the individual number of the queried sub resources (e.g., parts) based on bill of materials (BOM) that are held beforehand.

Finally, the transaction result replying unit 718 of the smart contract 701 replies the merged result by the step S1012 to the call source (S1013), and terminates the processing.

<Call Relationship between Distributed Ledger Subsystems>

Here, an operation concept of the distributed ledger subsystem according to the first embodiment will be described based on a call relationship between the distributed ledger subsystems with reference to FIGS. 11A and 11B.

Figure 11A:
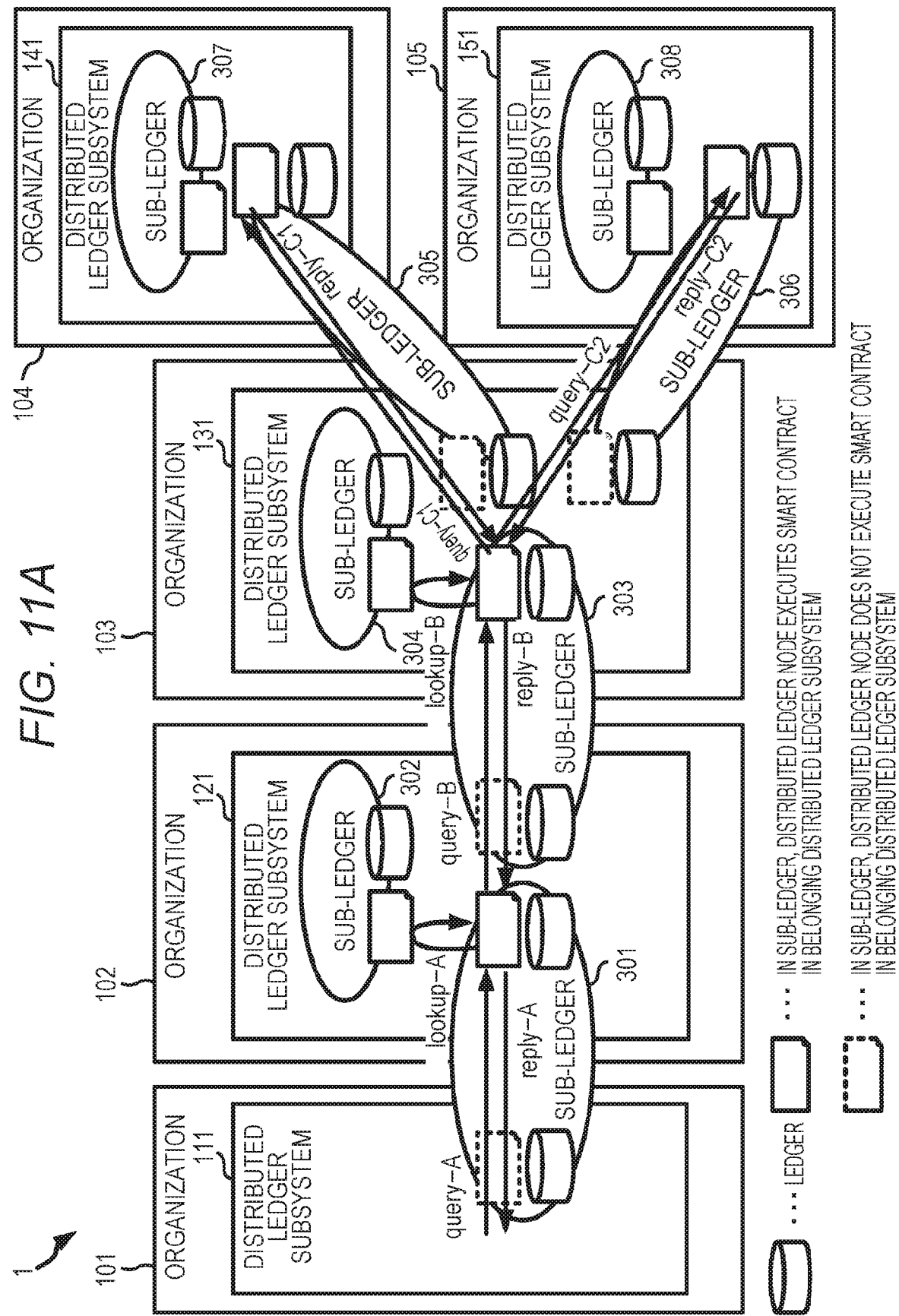
FIG. 11A is a diagram describing an operation concept of the distributed ledger subsystem (granularity of the distributed ledger subsystem) according to the first embodiment.
Figure 11B:
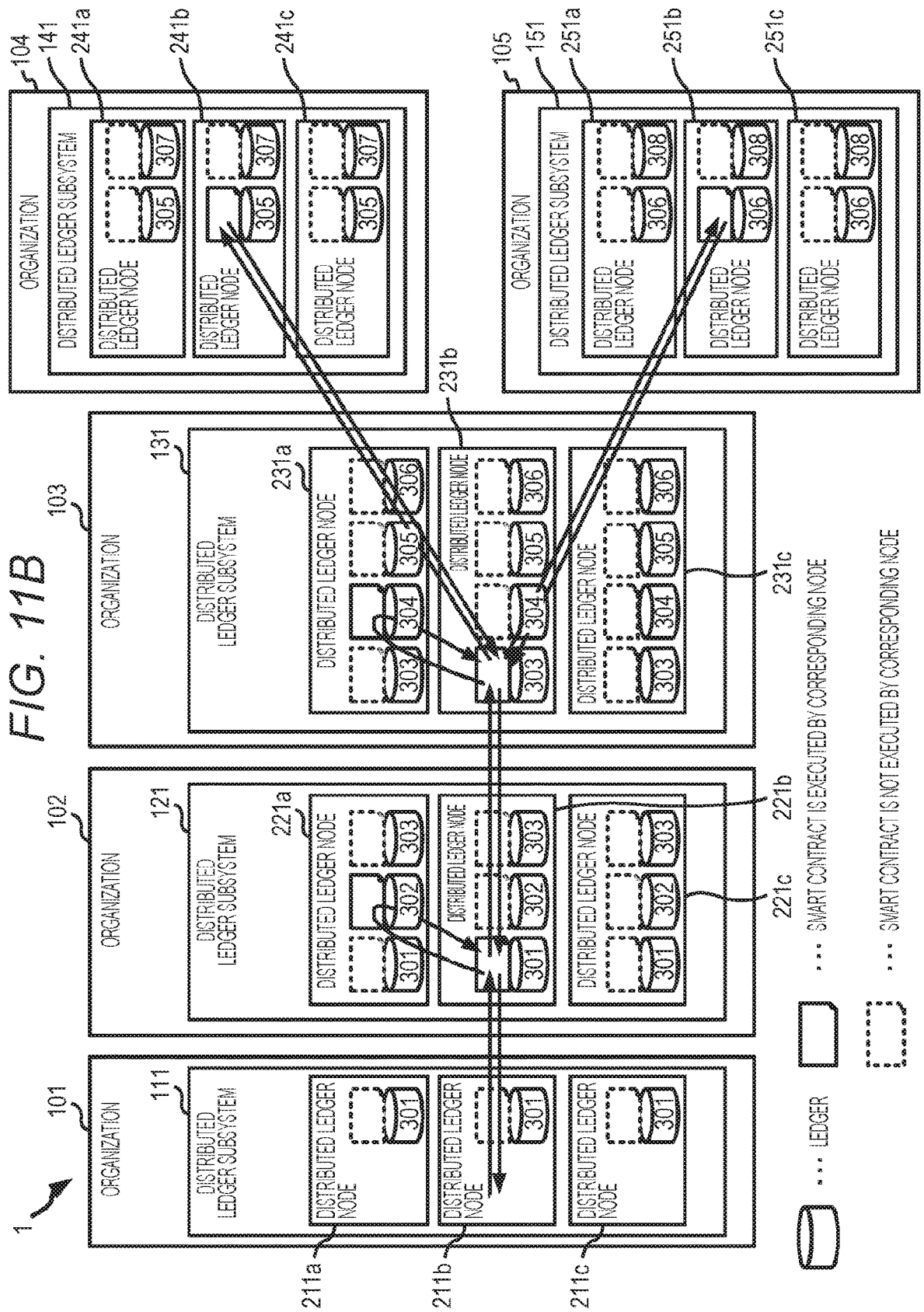
FIG. 11B is a diagram describing an operation concept of the distributed ledger subsystem (granularity of the distributed ledger node) according to the first embodiment.

The transaction is executed in the call relationship as illustrated in FIG. 11 by executing the processings of the smart contract 701 described above. For the same reason as the description in FIG. 3, a description is made in a granularity of the distributed ledger subsystem (FIG. 11A), and a description is then made in a granularity of the distributed ledger node (FIG. 11B).

First, FIG. 11A is a diagram illustrating a call relationship in a granularity of the distributed ledger subsystem. In FIG. 11A, the words "query", "lookup", and "reply" correspond to the transaction calling unit 716, the sub-ledger reference unit 713, and the transaction result replying unit 718 described in FIG. 7A. In addition, "-A", "-B", "-C1", and "-C2" at the end of each word mean the symbol of the transaction in the sub-ledger (the transactions with different symbols are different).

As illustrated in FIG. 11A, a recursive call processing is performed only from the distributed ledger subsystem to which the sub-ledger of a recursive call destination belongs.

Meanwhile, FIG. 11B is a diagram describing an operation concept of the distributed ledger subsystem (granularity of the distributed ledger node) according to the first embodiment based on a call relationship in the granularity of the distributed ledger node. In FIG. 11B, the distributed ledger client is omitted and only the distributed ledger node is illustrated.

In the call relationship of each step, only a specific distributed ledger node is specified in the call destination so that no double transaction occurs. Further, although not illustrated in the drawing, the transaction from the distributed ledger subsystem 111 is generated from the distributed ledger client. In addition, although not illustrated in the drawing, in the present embodiment, the transaction called by the distributed ledger node is transmitted to the distributed ledger client (in the distributed ledger subsystem to which the transaction belongs, or in another distributed ledger subsystem belonging to the sub-ledger) accessible to the distributed ledger subsystem of the call destination.

Figure 12:
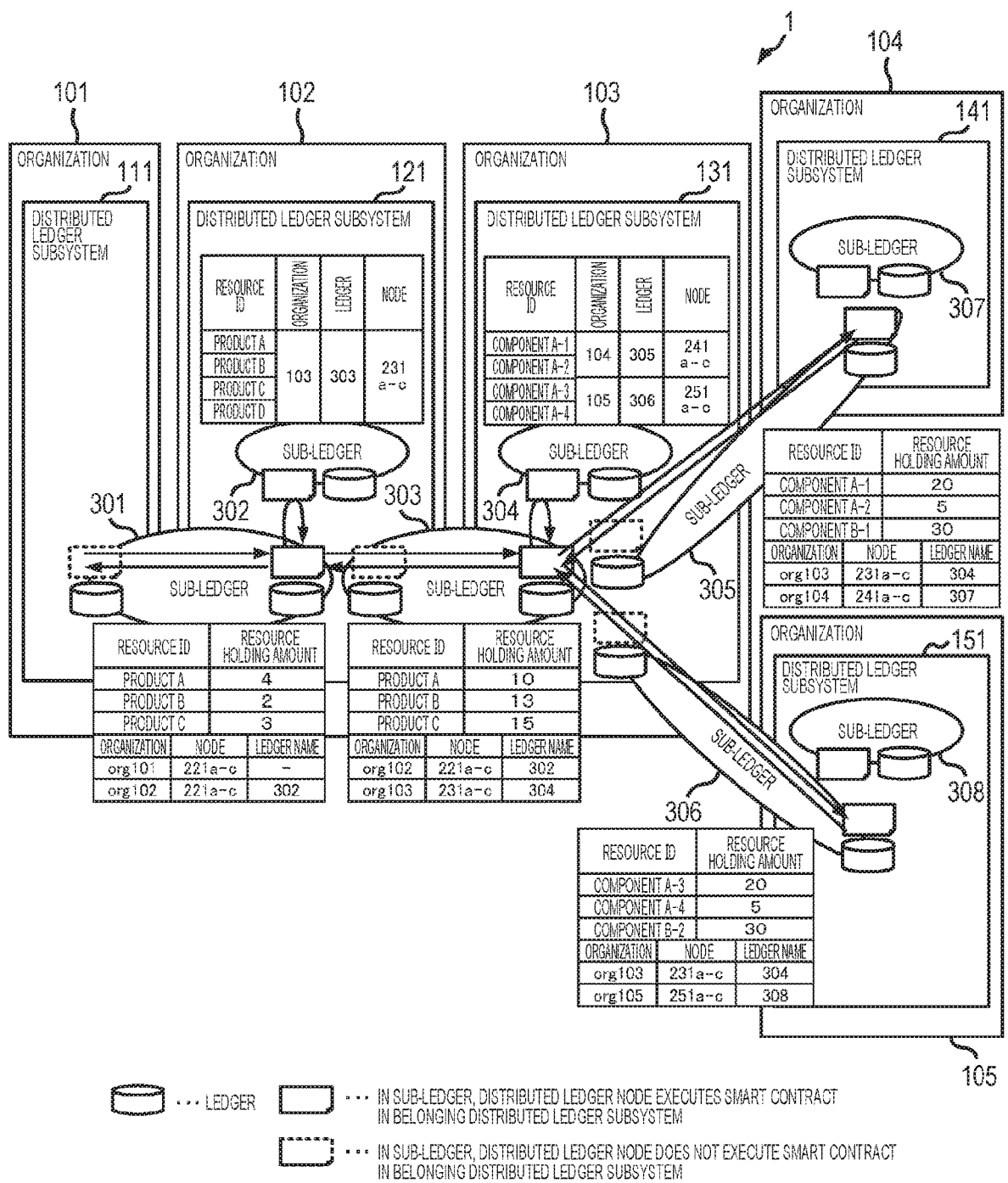
FIG. 12 is a diagram illustrating an example of a call relationship and ledger data according to the first embodiment.

FIG. 12 is a diagram illustrating an example of a call relationship and ledger data according to the first embodiment. The call relationship is the same as that in FIG. 11. In FIG. 12, an organization 101 and an organization 102 share the number information of "product", and the organization 102 and an organization 103 share the number information of "product" having the same granularity. Meanwhile, the organization 103 and an organization 104 share the number information of "parts (in the sense of the organization 101)" and the organization 103 and an organization 105 share the number information of "parts (in the sense of the organization 101).

Only a limited number information can be grasped from the organization 101 only with individual sub-ledgers, but by inquiring recursively in this manner, the number information aggregated throughout the system can be acquired without directly sharing the sub-ledger.

<Sequence>

Figure 13:
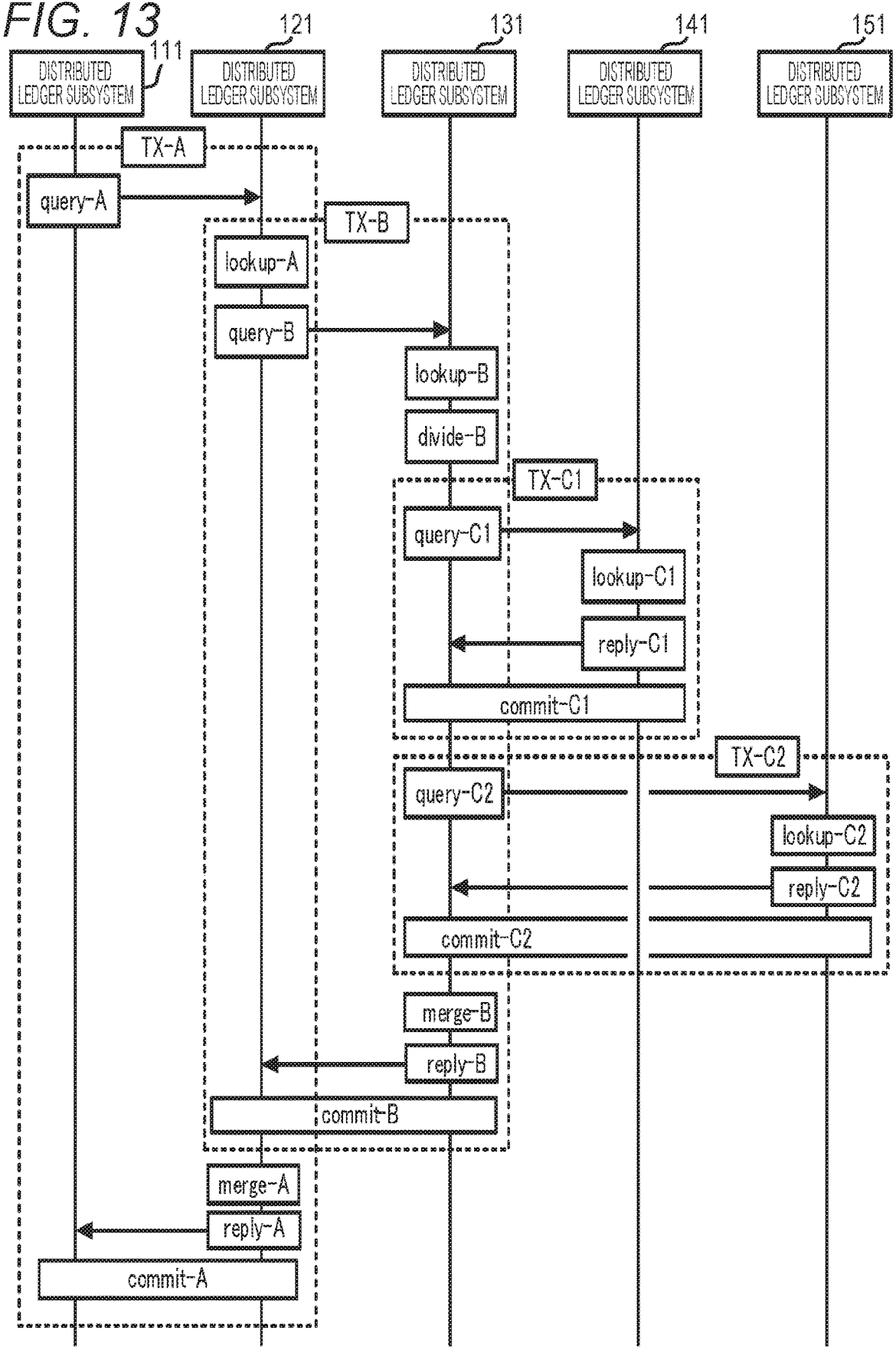
FIG. 13 is a sequence diagram illustrating a processing in each distributed ledger subsystem according to the first embodiment.

FIG. 13 is a sequence diagram illustrating a processing in each distributed ledger subsystem according to the first embodiment. Here, a processing flow in the granularity of the distributed ledger subsystems 111, 121, 131, 141, and 151 will be described again.

In the drawing, "TX-A", "TX-B", "TX-C1", and "TX-C2" illustrate different (sub) transactions, respectively.

In addition, "query", "lookup", "divide", "merge", and "reply" correspond to the transaction calling unit 716, the sub-ledger reference unit 713, the transaction dividing unit 714, the transaction result merging unit 717, and the transaction result replying unit 718, respectively, described in FIG. 7A. In addition "commit" means to update the ledger data.

As illustrated in FIG. 13, the distributed ledger subsystem 121 that receives an execution request of a transaction originating from the distributed ledger subsystem 111 performs a transaction execution request (query) for the distributed ledger subsystem 131, and in this case, the distributed ledger subsystem 131 refers to (looks up) the sub-ledger data, divides the transaction as necessary, and performs one or more transaction execution requests (queries) to other distributed ledger subsystems 141 and 151. In addition, the transaction execution results replied from the distributed ledger subsystems 141 and 151 are merged and is replied to the distributed ledger subsystem 111 of a transmit source of the request. Through such a chain of sub-transactions, the transaction across the entire distributed ledger system is executed.

<For GUI>

Figure 14:
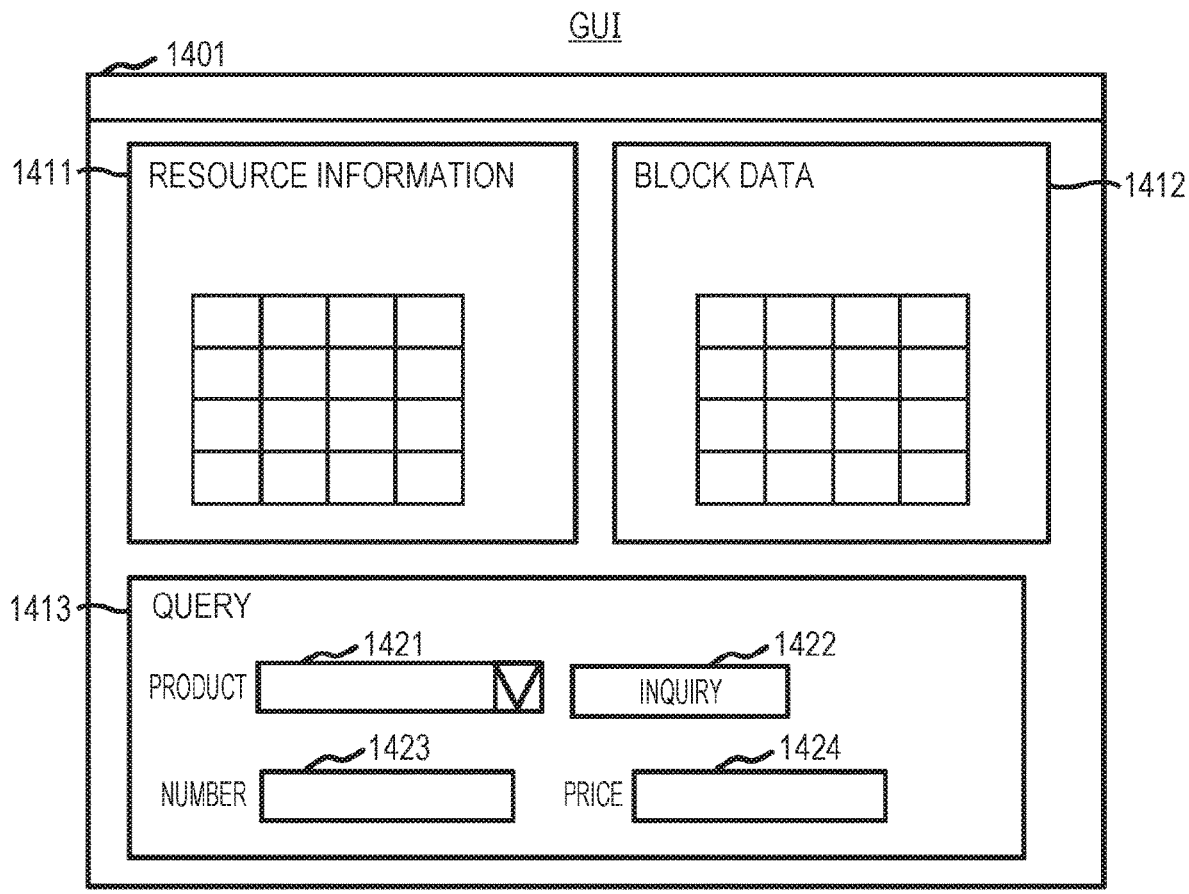
FIG. 14 is a diagram illustrating an example of graphic user interface (GUI) according to the first embodiment.

FIG. 14 is a diagram illustrating an example of graphic user interface (GUI) according to the first embodiment. The GUI is an example of a screen in which the distributed ledger subsystem that receives the transaction execution results aggregated described above displays the transaction execution results on an output device such as its own display device.

Components of the GUI 1401 illustrated in the drawing include a resource information sub screen 1411, a block data sub screen 1412, and a query sub screen 1413. The query sub screen 1413 includes a product ID display area 1421, an inquiry button 1422, a number display area 1423, and a price display area 1424.

In the example illustrated in the present drawing, the use of each component is as follows. The resource information sub screen 1411 displays the information managed by the ledger data management table 442, for example, such as the resource information 601 to 603 in FIG. 6B.

In addition, the block data sub screen 1412 displays the information managed by the transaction argument temporary management table 455 of FIG. 5.

In addition, a value specified in the product ID display area 1421 is a value of the resource ID of the transaction argument specified by the user.

In addition, the inquiry button 1422 is pushed by the user to trigger the transaction execution request.

In addition, the number display area 1423 and the price display area 1424 are areas for displaying the transaction execution results (in addition to this, information such as lead time may be appropriately displayed).

In the GUI 1401, the resource information sub screen 1411 and the block data sub screen 1412 may display a sub screen for each sub-ledger to which they belong.

Figure 15:
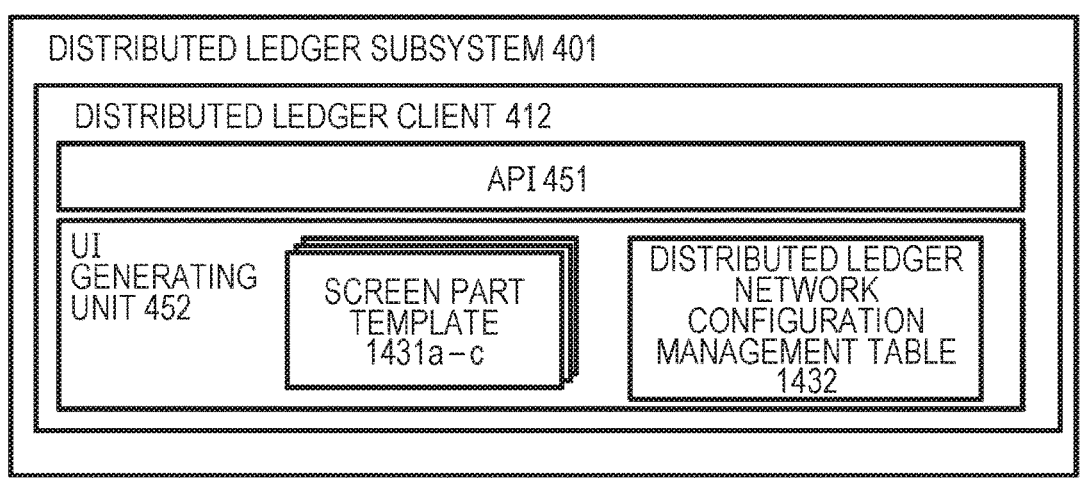
FIG. 15 is a diagram illustrating a configuration example of a distributed ledger subsystem according to the first embodiment.

To this end, the UI generating unit 452 (see FIG. 15) in the distributed ledger client 412 holds screen part templates 1431*a* to 1431*c* and a distributed ledger network configuration management table 1432.

Among these, the distributed ledger network configuration management table 1432 has profile information related to the sub-ledger to which its own distributed ledger subsystem 401 belongs. Based on such information, the UI generating unit 452 performs a screen control processing so as to display, on the GUI 1401, sub screens corresponding to the number of sub-ledgers to which UI generating unit 452 belongs.

<Hardware Configuration Example>

Figure 16:
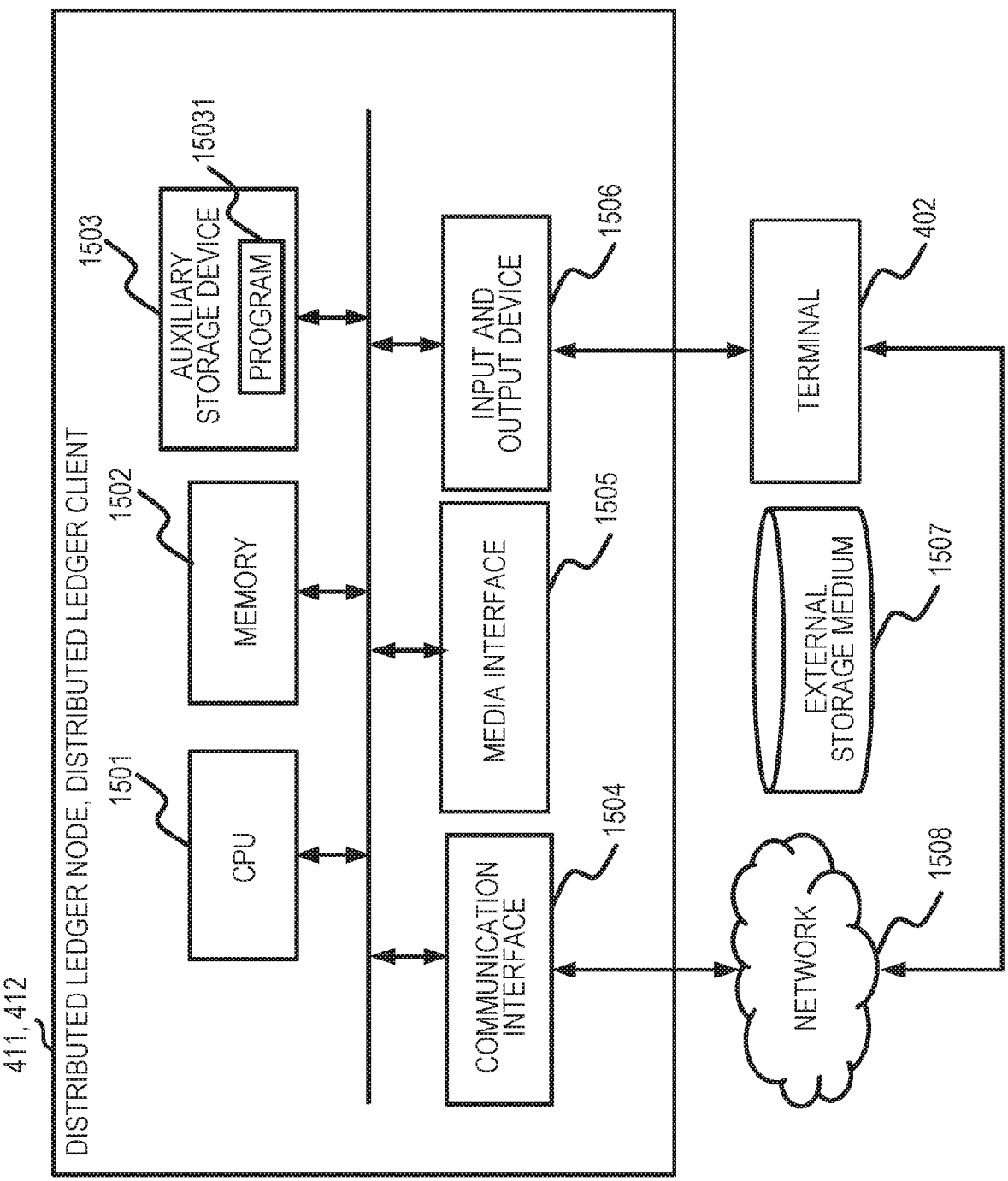
FIG. 16 is a diagram illustrating a hardware configuration example of the distributed ledger node and the distributed ledger client according to the first embodiment.

Subsequently, an example of a hardware configuration of the distributed ledger node 411 and the distributed ledger client 412 will be described. FIG. 16 is a diagram illustrating a hardware configuration example of the distributed ledger node 411 and the distributed ledger client 412 according to the first embodiment.

The distributed ledger node 411 and the distributed ledger client 412 illustrated in FIG. 16 can be realized by using a general calculator including a central processing unit (CPU) 1501, which is an arithmetic device, a memory 1502, and an auxiliary storage device 1503.

In addition, each of the processing units implemented by the distributed ledger node 411 and the distributed ledger client 412 is realized by the CPU 1501 executing a program 15031 stored in the auxiliary storage device 1503. The program 15031 may be stored in the auxiliary storage device 1503 in advance, and may be acquired from another device via a communication interface 1504 when necessary or read from an available medium via a media interface 1505.

In addition, the medium described above refers to, for example, a communication medium (i.e., a network such as a wired, wireless, or optical network or a carrier wave or a digital signal propagating through the network), or an external storage medium 1507 removable to the media interface 1505.

Further, the distributed ledger node 411 and the distributed ledger client 412 may be communicably connected to the terminal 402 so as to receive the operation from the terminal 402 via an input and output device 1506.

In addition, the configurations, functions, and the like described above may be implemented in hardware by designing some or all there in, for example, an integrated circuit. In addition, the configurations, functions, and the like described above may be implemented in software by interpreting and executing the program in which a processor performs each function. Information such as programs, tables, and files that implement each function can be recorded in the memory 1502, the auxiliary storage device 1503 such as a hard disk or a solid state drive (SSD), or a recording medium such as an integrated circuit (IC) card, a secure digital (SD) memory card, a digital versatile disc (DVD), or the like. In addition, each of the above configurations may be partially or completely implemented as virtual hardware (virtual machine).

Second Embodiment

Hereinafter, a second embodiment of the present invention will be described with referent to the drawings. Basically, since a second embodiment is the same as the first embodiment described above, only a difference from the first embodiment described above will be described here.

Figure 17:
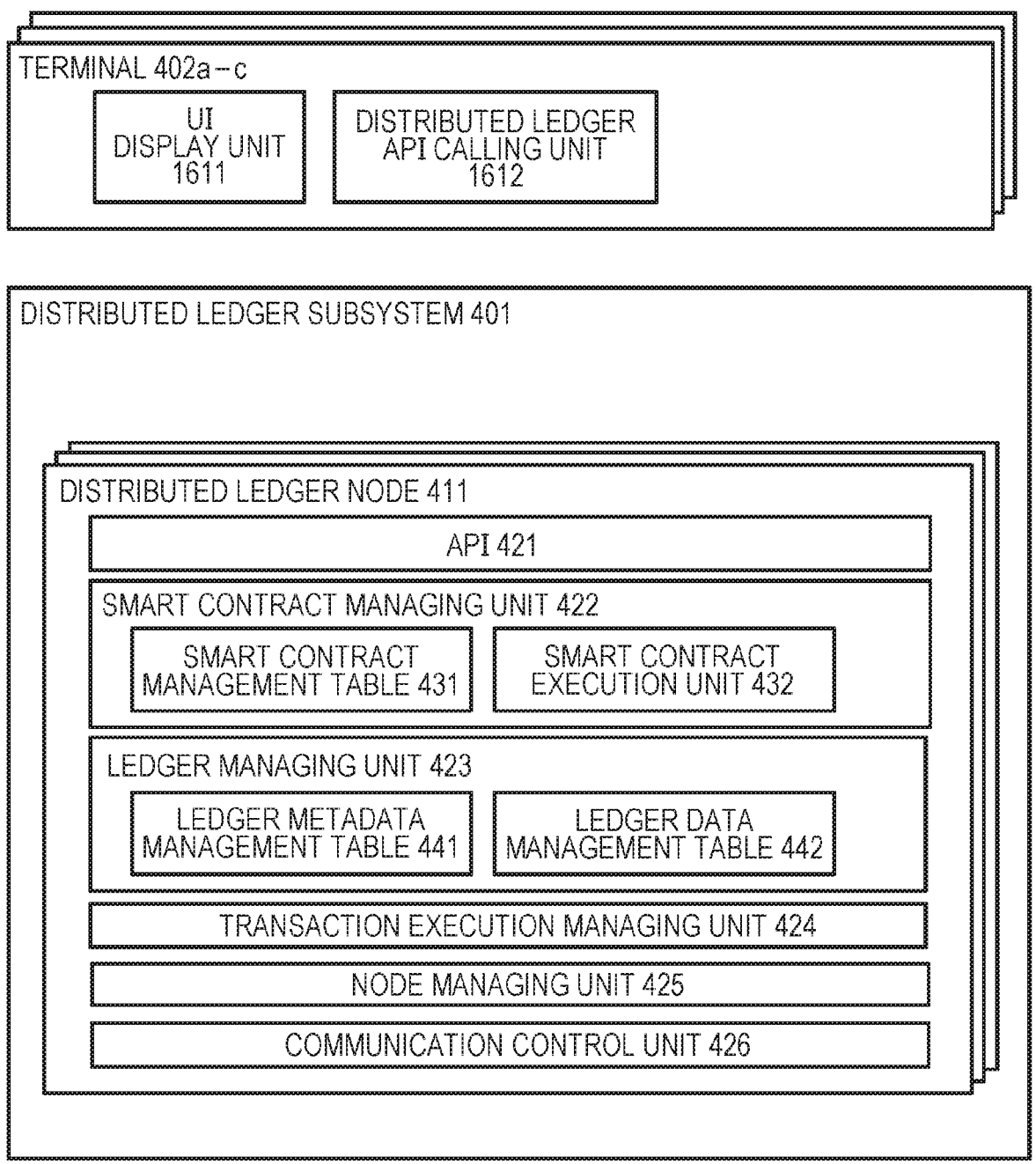
FIG. 17 is a diagram illustrating a configuration example of a distributed ledger client and the distributed ledger subsystem according to a second embodiment.

FIG. 17 is a diagram illustrating a configuration of the distributed ledger subsystem 401 according to a second embodiment. A difference from the distributed ledger subsystem according to the first embodiment described above is that the terminal 402 includes a UI display unit 1611 and a distributed ledger API calling unit 1612.

Among these, the UI display unit 1611 is the same as the UI generating unit 452 according to the first embodiment. In addition, the distributed ledger API calling unit 1612 is the same as the transaction calling unit 453. That is, the distributed ledger subsystem 401 has a configuration in which some of the functions of the distributed ledger client 412 are implemented on the terminal 402. Therefore, the terminal 402 directly calls the processing of the distributed ledger node 411.

Figure 18:
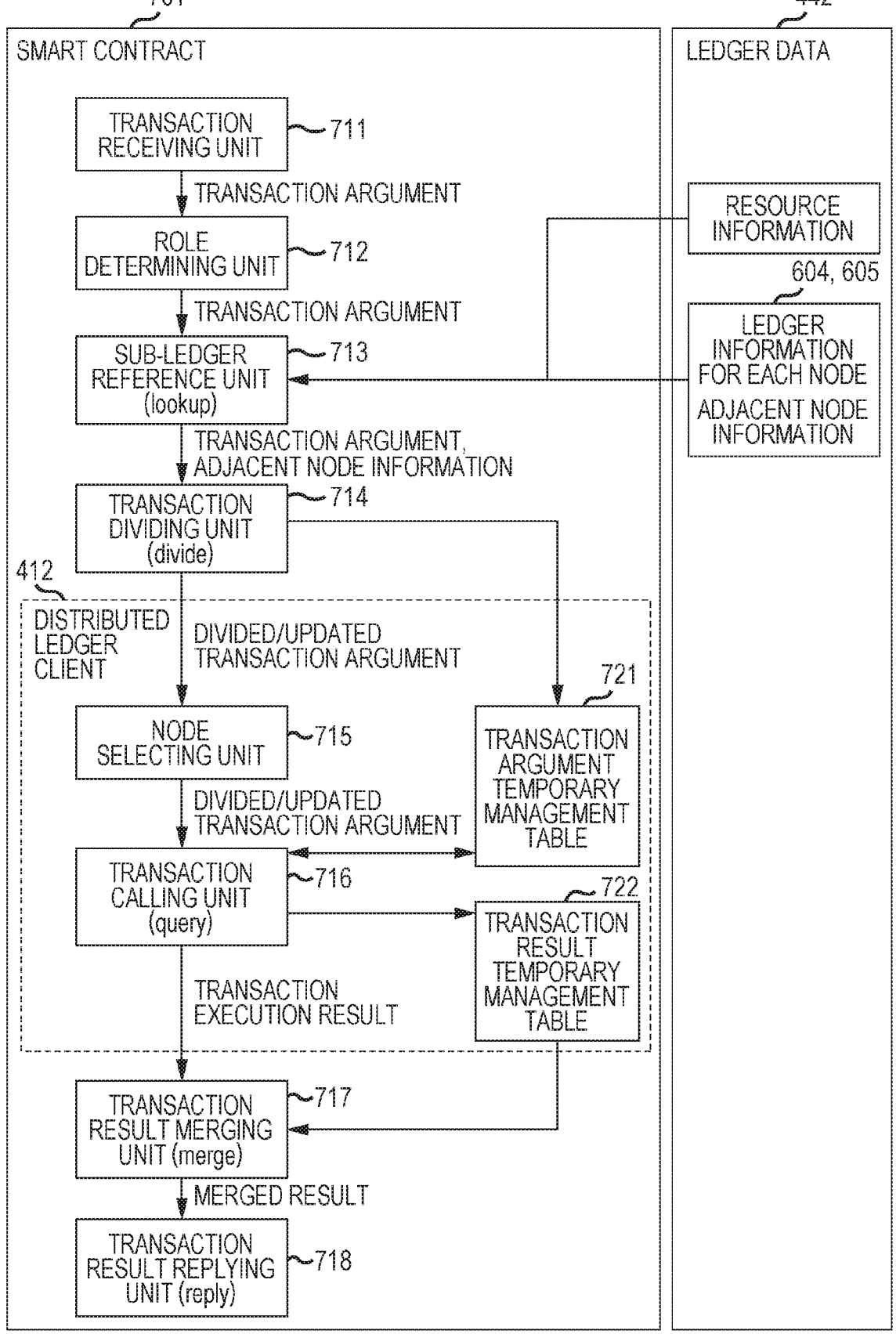
FIG. 18 is a diagram illustrating an implementation example of a smart contract according to the second embodiment.

FIG. 18 is a diagram illustrating an implementation example of a smart contract according to the second embodiment. FIG. 18 illustrates that the functional units of the distributed ledger client 412 are implemented in the smart contract 701.

In particular, the transaction calling unit 453, the transaction argument temporary management table 455, and the transaction result temporary management table 456 have portions overlapping with the components in the smart contract 701 illustrated in the first embodiment, and are replaced with the functional units illustrated FIG. 18 (the node management table 454 is replaced with the adjacent node information 605, which is data in the sub-ledger).

In the first embodiment, FIG. 11B has described that the distributed ledger client is omitted. Meanwhile, in the configuration according to the second embodiment, in cooperation between the respective transactions, the distributed ledger client itself is unnecessary, and a structure in FIG. 11B is realized.

Hereinafter, the embodiments (the first embodiment and the second embodiment) described above are supplemented. In each of the above-mentioned embodiments, the situation in which the plurality of sub-ledgers exists in the single distributed ledger is assumed and described. Meanwhile, the same configuration or processing as that of the above-described embodiments can also be applied to a case in which a plurality of distributed ledgers exist and a transaction is executed between distributed ledgers.

In addition, a shared range of each sub-ledger (the distributed ledger subsystem to which it belongs or the distributed ledger node to which it belongs) illustrated in each embodiment is merely one example. For example, the sub-ledger may be shared by three or more organizations. In addition, the ledger data recorded in the sub-ledger is also merely one example. In each embodiment, the ledger data such as the resource information is also described as the ledger data in the sub-ledger shared by a plurality of organizations, but, may be the ledger data in the sub-ledger shared by only a single organization.

Although the best mode for carrying out the present invention has been specifically described above, the present invention is not limited thereto, and the present invention can be variously modified within a range that does not deviate from the gist of the present invention.

According to the present embodiment, it is possible to efficiently perform appropriate information sharing across each of the distributed ledger subsystems.

According to the description in the present specification, at least the following is evident. That is, in the distributed ledger system according to the present embodiment, each of the distributed ledger subsystems may additionally hold adjacent node information as a list of distributed ledger nodes that hold a sub-ledger, which is a target of a transaction request, select a distributed ledger node in another distributed ledger subsystem as a transmission destination of the transaction request from the adjacent node information based on a predetermined node selection criterion which is determined in advance, when the transaction request is transmitted, by executing a smart contract, and transmit the transaction request to the selected distributed ledger node.

Thereby, it is possible to efficiently specify a desirable transmission destination of the transaction request, and it is possible to efficiently perform appropriate information sharing across each of the distributed ledger subsystems.

In addition, in the distributed ledger system according to the present embodiment, each of the distributed ledger subsystems may hold information about a sub-ledger to be called according to a transaction argument and the distributed ledger node that holds the corresponding sub-ledger in the adjacent node information, determine whether or not the transaction request targeted for ledger data of another sub-ledger is transmitted based on a value of the transaction argument in the received predetermined transaction request and the adjacent node information by executing the smart contract, and transmit the transaction request to the corresponding selected distributed ledger node when the transmission of the transaction request is required as the result of the determination.

Thereby, whether or not the transaction request is transmitted can be efficiently determined to avoid unnecessary transmission of the transaction request. Further, it is possible to efficiently perform appropriate information sharing across each of the distributed ledger subsystems.

In addition, in the distributed ledger system according to the present embodiment, each of the distributed ledger subsystems may define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmit the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

Thereby, for example, it is possible to flexibly execute information collection between the buyer and the supplier in the supply chain, such as the generation of information on products which are manufacturable by transmitting the transaction request on inventory information of the parts and acquiring the reply thereof and aggregating the reply based on a hierarchical structure such as the products to be handled in the supply chain and the parts constituting the products. Further, it is possible to efficiently perform appropriate information sharing across each of the distributed ledger subsystems.

Further, the distributed ledger subsystem according to the present embodiment may additionally hold adjacent node information as a list of distributed ledger nodes that hold a sub-ledger, which is a target of a transaction request, select a distributed ledger node in another distributed ledger subsystem as a transmission destination of the transaction request from the adjacent node information based on a predetermined node selection criterion which is determined in advance, when the transaction request is transmitted, by executing the smart contract, and transmit the transaction request to the selected distributed ledger node.

In addition, the distributed ledger subsystem according to the present embodiment may hold information about a sub-ledger to be called according to a transaction argument and the distributed ledger node that holds the sub-ledger in the adjacent node information, determine whether or not the transaction request targeted for ledger data of another sub-ledger is transmitted based on a value of the transaction argument in the received predetermined transaction request and the adjacent node information by executing the smart contract, and transmit the transaction request to the corresponding selected distributed ledger node when the transmission of the transaction request is required as the result of the determination.

In addition, the distributed ledger subsystem according to the present embodiment may define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmit the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

Further, the distributed ledger node according to the present embodiment may additionally hold adjacent node information as a list of distributed ledger nodes that hold a sub-ledger, which is a target of a transaction request, select a distributed ledger node in another distributed ledger subsystem as a transmission destination of the transaction request from the adjacent node information based on a predetermined node selection criterion which is determined in advance, when the transaction request is transmitted, by executing the smart contract, and transmit the transaction request to the selected distributed ledger node.

In addition, the distributed ledger node according to the present embodiment may hold information about a sub-ledger to be called according to a transaction argument and the distributed ledger node that holds the sub-ledger in the adjacent node information, determine whether or not the transaction request targeted for ledger data of another sub-ledger is transmitted based on a value of the transaction argument in the received predetermined transaction request and the adjacent node information by executing the smart contract, and transmit the transaction request to the selected distributed ledger node when the transmission of the transaction request is required as the result of the determination.

In addition, the distributed ledger node according to the present embodiment may define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmit the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

Although the present disclosure has been described with reference to example embodiments, those skilled in the art will recognize that various changes and modifications may be made in form and detail without departing from the spirit and scope of the claimed subject matter.

What is claimed is:

1. A distributed ledger system constituted by a plurality of distributed ledger subsystems, the distributed ledger system comprising:
   a plurality of computing resources associated with a business organization and configured in a network, the computing resources including one or more nodes arranged in each of the plurality of distributed ledger subsystems;
   each of the distributed ledger subsystems includes a sub-ledger that holds ledger data shared in the distributed ledger subsystems, and a smart contract that interlocks between the distributed ledger subsystems having a common sub-ledger to perform a transaction processing related to an input and output of the ledger data,
   each of the distributed ledger subsystems includes a distributed ledger client comprising a processor that is programmed to
   transmit a transaction request, targeted for ledger data of another sub-ledger different from the common sub-ledger managed by another distributed ledger subsystem, to a distributed ledger subsystem having the common sub-ledger by receiving the transaction request from a first terminal and executing the smart contract, and reply to the transaction request with a transaction reply, obtained from at least the distributed ledger subsystem having the common sub-ledger, to the first terminal;

each of the distributed ledger subsystems additionally includes a distributed ledger node comprising a processor and a memory that holds adjacent node information as a list of distributed ledger nodes that hold a sub-ledger, which is a target of the transaction request, the processor of the distributed ledger node is programmed to select a distributed ledger node in the distributed ledger subsystem having the common sub-ledger as a transmission destination of the transaction request from the adjacent node information based on a predetermined node selection criterion, when the transaction request is transmitted, by executing the smart contract, and transmit the transaction request to the selected distributed ledger node;

wherein the distributed ledger client of each of the distributed ledger subsystems is configured to hold information about a sub-ledger to be called according to a transaction argument and the distributed ledger node that holds a corresponding sub-ledger in the adjacent node information, determine whether or not the transaction request targeted for ledger data of the another sub-ledger is transmitted based on a value of the transaction argument in the received predetermined transaction request and the adjacent node information by executing the smart contract, and transmit the transaction request to the corresponding selected distributed ledger node when the transmission of the transaction request is required as the result of the determination;

wherein each of the distributed ledger subsystems is configured to define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmits the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

2. A distributed ledger subsystem constituting a distributed ledger system, the distributed ledger subsystem comprising:

a plurality of computing resources associated with a business organization and configured in a network, the computing resources including one or more nodes arranged in the distributed ledger subsystem;

wherein the distributed ledger subsystem includes a sub-ledger that holds ledger data shared in the distributed ledger subsystem, and a smart contract that interlocks between the distributed ledger subsystems having a common sub-ledger to perform a transaction processing related to an input and output of the ledger data, the distributed ledger subsystem includes a distributed ledger client comprising a processor that is programmed to transmit a transaction request, targeted for ledger data of another sub-ledger different from the common sub-ledger managed by another distributed ledger subsystem, to a distributed ledger subsystem having the common sub-ledger by receiving the transaction request from a first terminal and executing the smart contract, and reply to the transaction request with a transaction reply, obtained from at least the distributed ledger subsystem having the common sub-ledger, to the first terminal;

the distributed ledger subsystem additionally includes a distributed ledger node comprising a processor and a memory that holds adjacent node information as a list of distributed ledger nodes that hold a sub-ledger, which is a target of the transaction request, the processor of the distributed ledger node is programmed to select a distributed ledger node in the distributed ledger subsystem having the common sub-ledger as a transmission destination of the transaction request from the adjacent node information based on a predetermined node selection criterion, when the transaction request is transmitted, by executing the smart contract, and transmit the transaction request to the selected distributed ledger node;

wherein the distributed ledger client of the distributed ledger subsystem is configured to hold information about a sub-ledger to be called according to a transaction argument and the distributed ledger node that holds a corresponding sub-ledger in the adjacent node information, determine whether or not the transaction request targeted for ledger data of the another sub-ledger is transmitted based on a value of the transaction argument in the received predetermined transaction request and the adjacent node information by executing the smart contract, and transmit the transaction request to the corresponding selected distributed ledger node when the transmission of the transaction request is required as the result of the determination;

wherein the distributed ledger subsystem is configured to define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmit the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

3. A distributed ledger node included in a distributed ledger subsystem constituting a distributed ledger system, the distributed ledger node comprising:

a plurality of computing resources associated with a business organization and configured in a network;

wherein the distributed ledger node includes a sub-ledger that holds ledger data shared in the distributed ledger subsystem to which the distributed ledger node belongs, and a smart contract that interlocks between nodes of another distributed ledger subsystem having a common sub-ledger to perform a transaction processing related to an input and output of the ledger data, each of the distributed ledger subsystems includes a distributed ledger client comprising a processor that is programmed to transmit a transaction request, targeted for ledger data of another sub-ledger different from the common sub-ledger managed by the another distributed ledger subsystem, to a predetermined node of another distributed ledger subsystem having the common sub-ledger by receiving the transaction request from a first terminal and executing the smart contract, and reply to the transaction request with a transaction reply, obtained from at least the predetermined node of the another distributed ledger subsystem, to the first terminal;

the distributed ledger node includes a processor and a memory that additionally holds adjacent node information as a list of distributed ledger nodes that hold a sub-ledger, which is a target of a transaction request, the processor of the distributed ledger node is programmed to select a distributed ledger node in the another distributed ledger subsystem as a transmission destination of the transaction request from the adjacent node information based on a predetermined node selection criterion, when the transaction request is transmitted, by executing the smart contract, and transmit the transaction request to the selected distributed ledger node;

wherein the distributed ledger client of the distributed ledger node is configured to hold information about a sub-ledger to be called according to a transaction argument and the distributed ledger node that holds a corresponding sub-ledger in the adjacent node information, determine whether or not the transaction request targeted for ledger data of another sub-ledger is transmitted based on a value of the transaction argument in the received predetermined transaction request and the adjacent node information by executing the smart contract, and transmit the transaction request to the corresponding selected distributed ledger node when the transmission of the transaction request is required as the result of the determination;

wherein the distributed ledger node is configured to define the transaction argument in the adjacent node information as a data structure according to a hierarchical structure of an event indicated by the corresponding transaction argument, divide the value of the transaction argument in the received predetermined transaction request into lower transaction arguments, which are one or more transaction arguments for a lower hierarchical level by executing the smart contract, perform the selection of the distributed ledger node based on a value of each of the corresponding divided lower transaction arguments and the adjacent node information, transmit the transaction request to the corresponding selected distributed ledger node, receive a transaction reply from the distributed ledger node of the transmission destination, aggregate the received transaction reply related to the lower hierarchical layer according to a transaction argument of a higher hierarchical layer than the lower hierarchical layer, and reply to a transmit source of the transaction request.

* * * * *